US009065241B2

(12) United States Patent
Zapata et al.

(10) Patent No.: US 9,065,241 B2
(45) Date of Patent: Jun. 23, 2015

(54) METHODS, SYSTEMS, AND APPARATUS FOR HIGH ENERGY OPTICAL-PULSE AMPLIFICATION AT HIGH AVERAGE POWER

(71) Applicants: Luis E. Zapata, Lexington, MA (US); Franz X. Kaertner, Cambridge, MA (US); Eduardo Granados Mateo, Cambridge, MA (US); Kyung-Han Hong, Lexington, MA (US)

(72) Inventors: Luis E. Zapata, Lexington, MA (US); Franz X. Kaertner, Cambridge, MA (US); Eduardo Granados Mateo, Cambridge, MA (US); Kyung-Han Hong, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 236 days.

(21) Appl. No.: 13/828,323

(22) Filed: Mar. 14, 2013

(65) Prior Publication Data
US 2013/0301117 A1 Nov. 14, 2013

Related U.S. Application Data

(60) Provisional application No. 61/645,721, filed on May 11, 2012, provisional application No. 61/761,360, filed on Feb. 6, 2013.

(51) Int. Cl.
*H01S 3/06* (2006.01)
*H01S 3/04* (2006.01)
(Continued)

(52) U.S. Cl.
CPC ................ *H01S 3/0604* (2013.01); *H01S 3/06* (2013.01); *H01S 3/0619* (2013.01); *H01S 3/04* (2013.01); *H01S 3/11* (2013.01); *H01S 3/0621* (2013.01); *H01S 3/1307* (2013.01); *H01S 3/1618* (2013.01); *H01S 3/2316* (2013.01); *H01S 3/2325* (2013.01);
(Continued)

(58) Field of Classification Search
CPC ...................................................... H01S 3/0604
USPC ......................................................... 359/7; 372/7
See application file for complete search history.

(56) References Cited

U.S. PATENT DOCUMENTS 4,081,763 A * 3/1978 Vlasenko et al. .......... 372/43.01
4,494,873 A * 1/1985 Perlmutter et al. ........... 356/467

(Continued)

OTHER PUBLICATIONS

International Search Report in related PCT Application No. PCT/US2013/034603, filed Mar. 29, 2013, mailed Mar. 11, 2014, 4 pages.

(Continued)

*Primary Examiner* — Ari M Diacou
(74) *Attorney, Agent, or Firm* — Cooley LLP

(57) ABSTRACT

An inventive composite optical gain medium capable includes a thin-disk gain layer bonded to an index-matched cap. The gain medium's surface is shaped like a paraboloid frustum or other truncated surface of revolution. The gain medium may be cryogenically cooled and optically pumped to provide optical gain for a pulsed laser beam. Photons emitted spontaneously in the gain layer reflect off or refract through the curved surface and out of the gain medium, reducing amplified spontaneous emission (ASE). This reduces limits on stored energy and gain imposed by ASE, enabling higher average powers (e.g., 100-10,000 Watts). Operating at cryogenic temperatures reduces thermal distortion caused by thermo-mechanical surface deformations and thermo-optic index variations in the gain medium. This facilitates the use of the gain medium in an image-relayed, multi-pass architecture for smoothed extraction and further increases in peak pulse energy (e.g., to 1-100 Joules).

45 Claims, 36 Drawing Sheets

(51) Int. Cl.
*H01S 3/11* (2006.01)
*H01S 3/042* (2006.01)
*H01S 3/13* (2006.01)
*H01S 3/16* (2006.01)
*H01S 3/23* (2006.01)
*H01S 3/00* (2006.01)

(52) U.S. Cl.
CPC ............... *H01S 3/005* (2013.01); *H01S 3/0057* (2013.01); *H01S 3/0092* (2013.01); *H01S 3/0405* (2013.01); *H01S 3/0407* (2013.01); *H01S 3/042* (2013.01); *H01S 3/0612* (2013.01); *H01S 3/0617* (2013.01); *H01S 3/1643* (2013.01); *H01S 2301/02* (2013.01)

(56) References Cited

U.S. PATENT DOCUMENTS

| | | | | |
|---|---|---|---|---|
| 5,301,204 | A * | 4/1994 | Cho et al. | 372/69 |
| 5,306,385 | A * | 4/1994 | Cho et al. | 427/70 |
| 5,369,657 | A * | 11/1994 | Cho et al. | 372/39 |
| 5,384,795 | A * | 1/1995 | Cho | 372/7 |
| 5,475,698 | A * | 12/1995 | Cho | 372/7 |
| 5,552,667 | A * | 9/1996 | Cho et al. | 313/498 |
| 5,790,583 | A * | 8/1998 | Ho | 372/92 |
| 5,796,771 | A * | 8/1998 | DenBaars et al. | 372/75 |
| 6,219,361 | B1 * | 4/2001 | Guch et al. | 372/10 |
| 6,347,109 | B1 | 2/2002 | Beach et al. | |
| 6,377,593 | B1 * | 4/2002 | Peterson et al. | 372/11 |
| 6,488,861 | B2 * | 12/2002 | Iltchenko et al. | 216/24 |
| 6,577,666 | B2 * | 6/2003 | Erhard et al. | 372/70 |
| 6,763,050 | B2 | 7/2004 | Zapata et al. | |
| 6,813,285 | B2 * | 11/2004 | Peterson | 372/10 |
| 6,822,994 | B2 * | 11/2004 | Kennedy | 372/66 |
| 6,834,070 | B2 * | 12/2004 | Zapata | 372/70 |
| 7,535,633 | B2 * | 5/2009 | Franjic et al. | 359/344 |
| 7,655,327 | B2 * | 2/2010 | Atanackovic | 428/701 |
| 7,751,457 | B2 * | 7/2010 | Suzudo et al. | 372/50.1 |
| 7,769,071 | B2 * | 8/2010 | Vahala et al. | 372/92 |
| 7,949,022 | B2 * | 5/2011 | Miesak et al. | 372/35 |
| 2002/0018611 | A1 * | 2/2002 | Maleki et al. | 385/15 |
| 2002/0018617 | A1 * | 2/2002 | Iltchenko et al. | 385/28 |
| 2002/0110164 | A1 * | 8/2002 | Vetrovec | 372/36 |
| 2002/0141041 | A1 | 10/2002 | Payne et al. | |
| 2003/0161376 | A1 * | 8/2003 | Zapata | 372/70 |
| 2003/0165005 | A1 | 9/2003 | Burstyn | |
| 2004/0114657 | A1 * | 6/2004 | Vetrovec | 372/70 |
| 2005/0129081 | A1 * | 6/2005 | Erhard et al. | 372/71 |
| 2005/0163185 | A1 * | 7/2005 | Vahala et al. | 372/67 |
| 2006/0153257 | A1 * | 7/2006 | Franjic et al. | 372/34 |
| 2007/0189350 | A1 * | 8/2007 | Young et al. | 372/50.124 |
| 2009/0161702 | A1 * | 6/2009 | Takeshita et al. | 372/7 |
| 2009/0210038 | A1 | 8/2009 | Neuberger et al. | |
| 2009/0296199 | A1 * | 12/2009 | Franjic et al. | 359/344 |
| 2010/0176200 | A1 | 7/2010 | Vollmer et al. | |
| 2011/0150013 | A1 * | 6/2011 | Spinelli et al. | 372/18 |
| 2013/0294467 | A1 * | 11/2013 | Moloney et al. | 372/20 |

OTHER PUBLICATIONS

Daniel E. Miller et al., "Sub-picosecond pulses at 100 W average power from a Yb:YLF chirped-pulse amplification system," Optics Letters, vol. 37, No. 13 (Jul. 1, 2012).

I. Mukhin et al., "One kilohertz cryogenic disk laser with high average power," in Diode-Pumped High Energy and High Power Lasers; ELI: Ultrarelativistic Laser-Matter Interactions and Petawatt Photonics; and HiPER: the European Pathway to Laser Energy, edited by J. Hein et al., Proc. of SPIE vol. 8080, 80800B (2011).

L. E. Zapata et al., "Ultrafast Composite-Thin-Disk Cryogenic Yb:YAG Laser Driver," 5th EPS-QEOD Europhoton Conference (Stockholm, Sweden, Aug. 26-31, 2012).

* cited by examiner

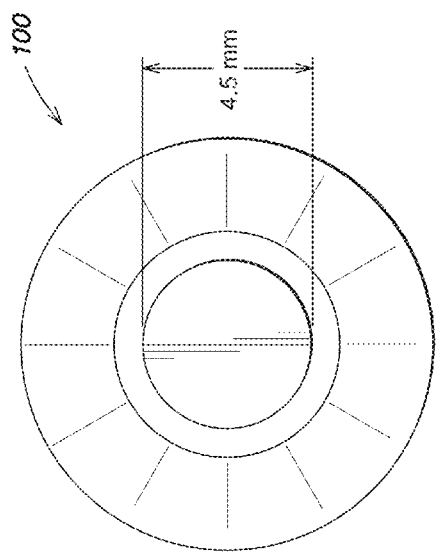
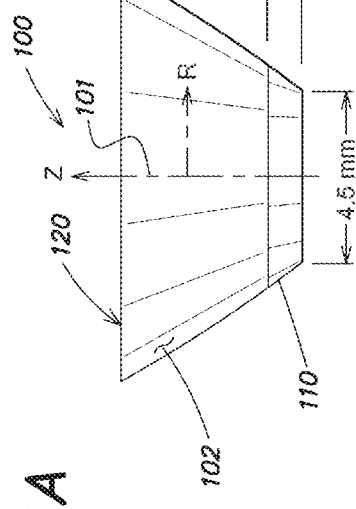
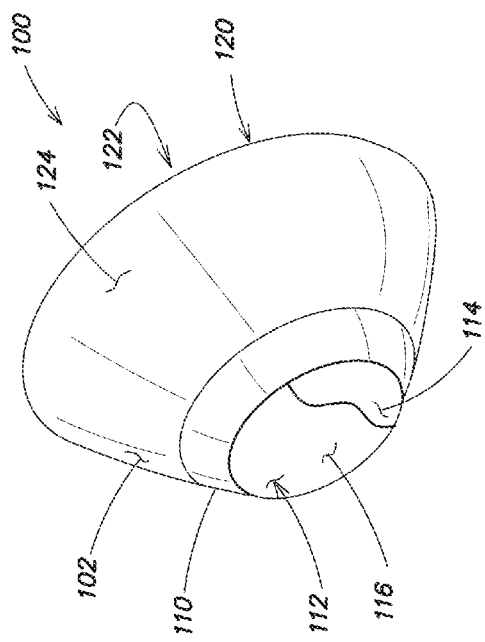

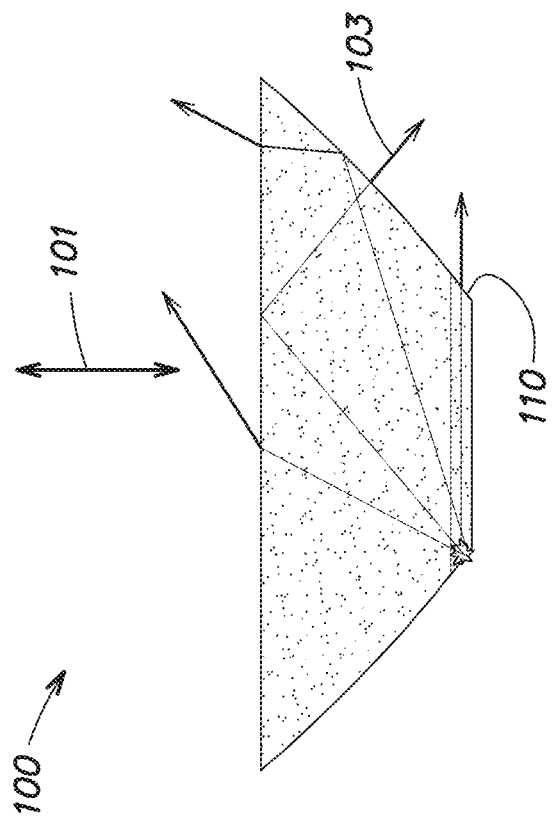
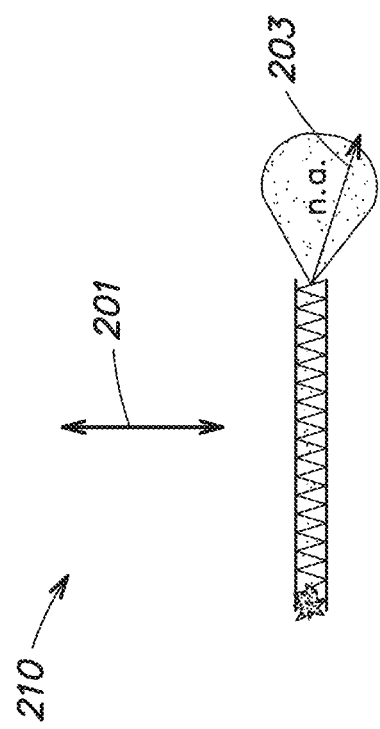
FIG. 2B
FIG. 2A

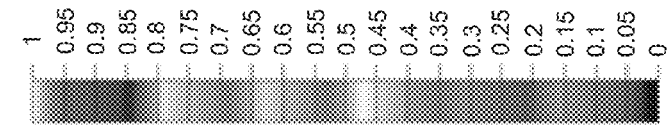
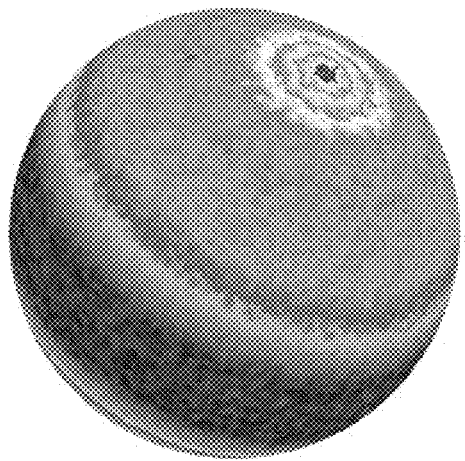
FIG. 3B
Fluorescence Flux Distribution
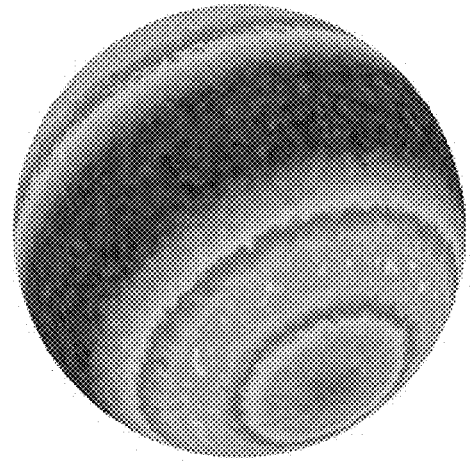
FIG. 3A

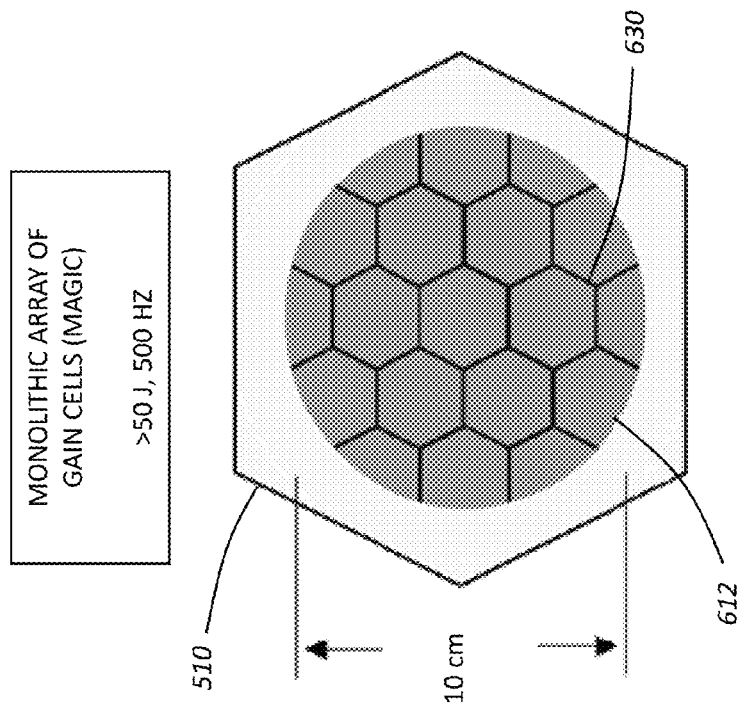
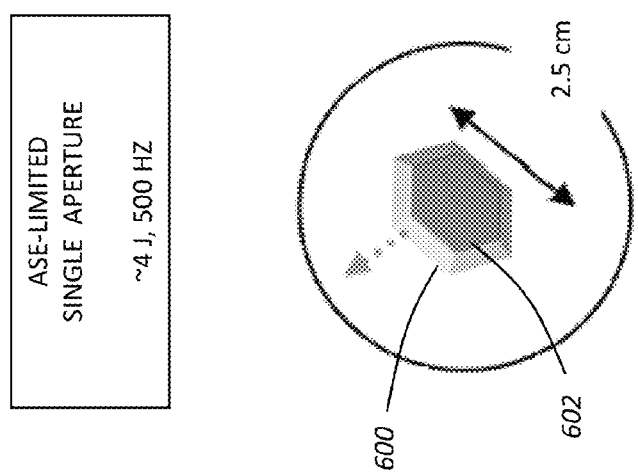
FIG. 6B
FIG. 6A

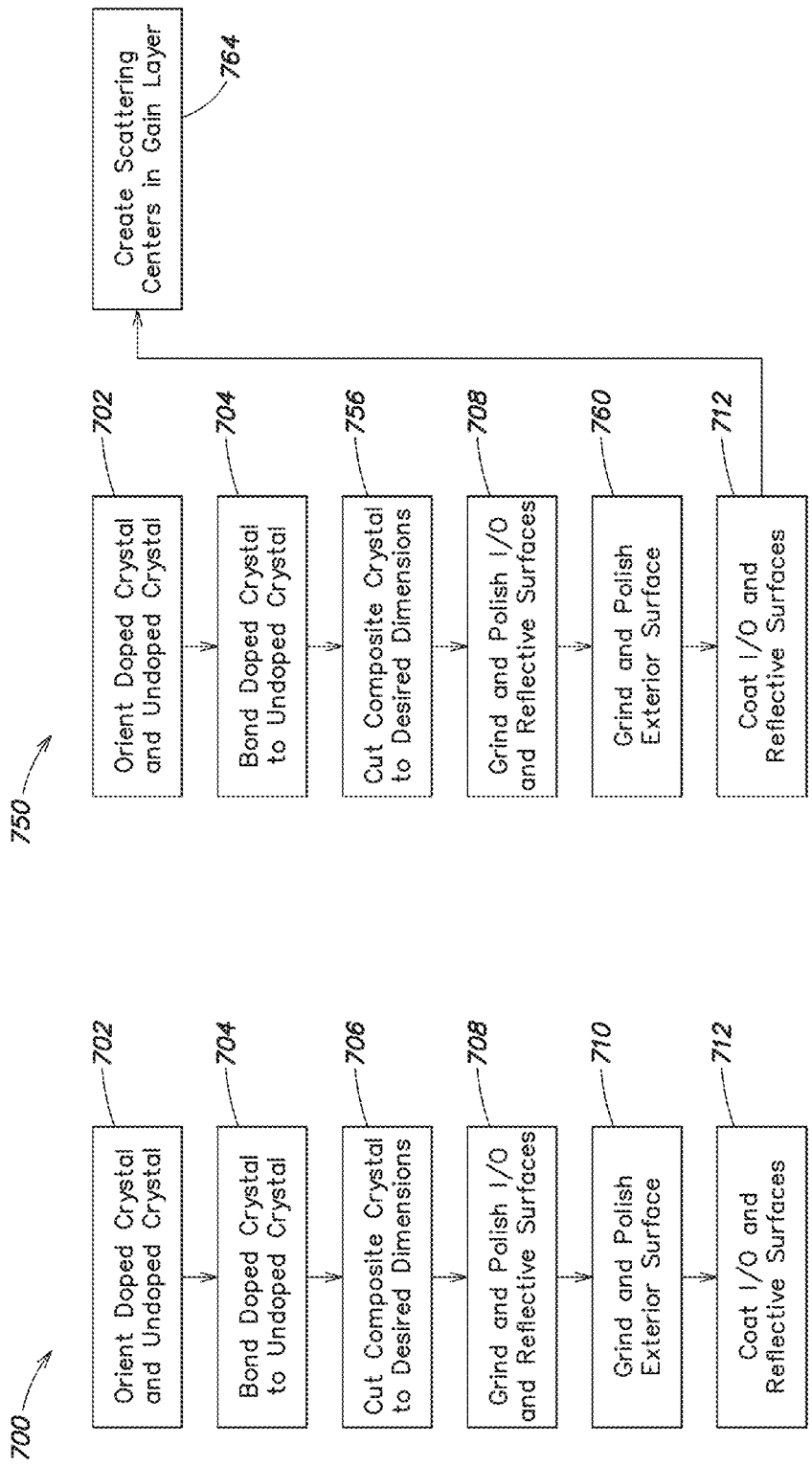

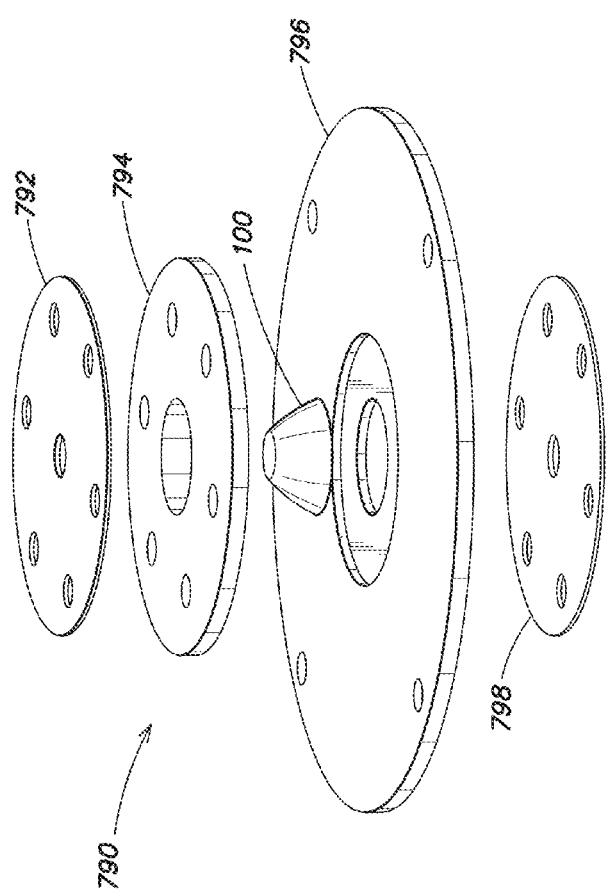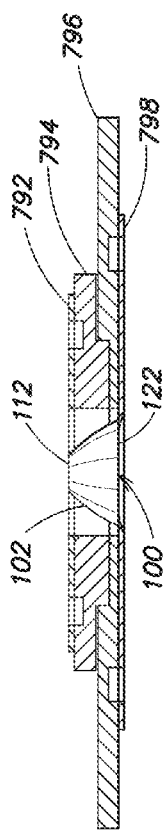

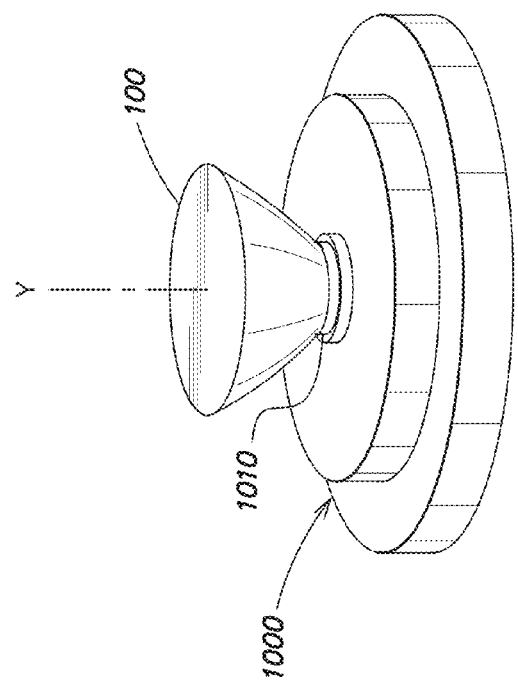
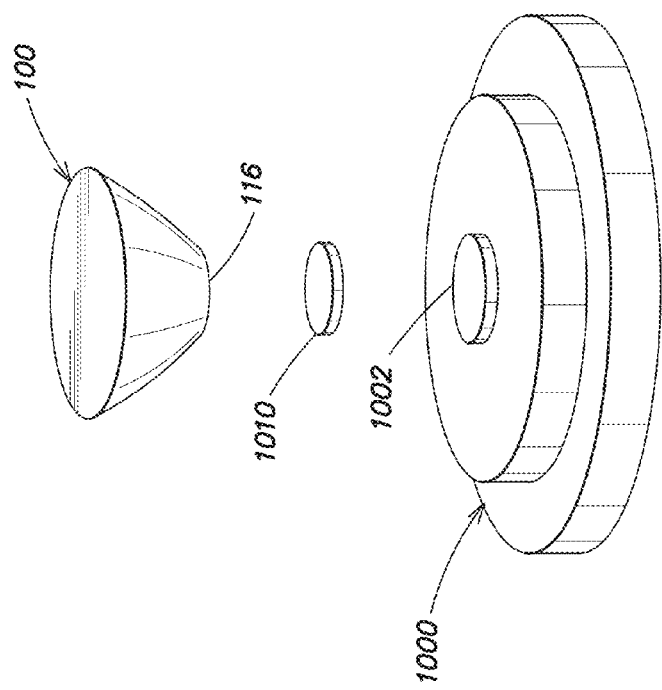

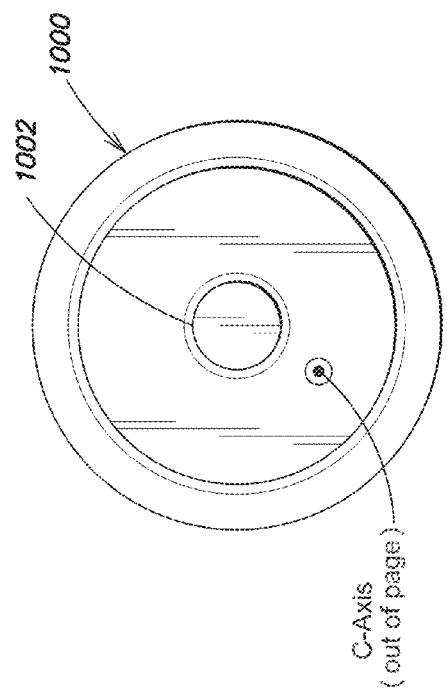
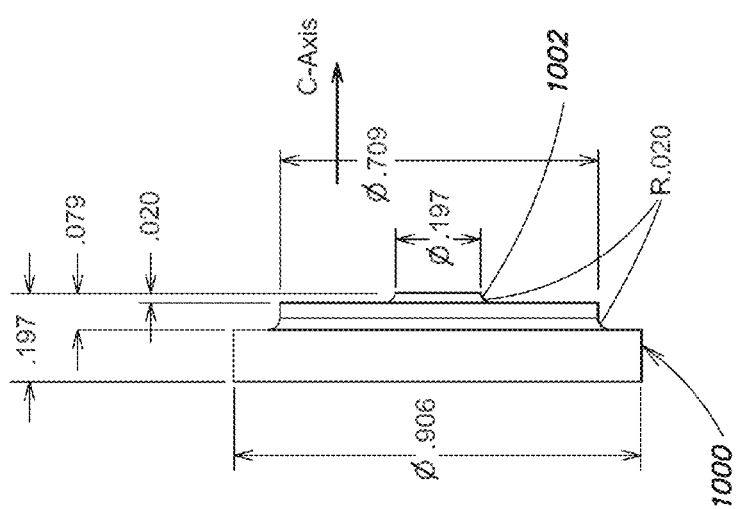
FIG. 10D
FIG. 10C

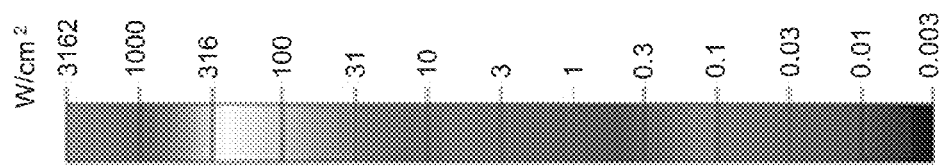
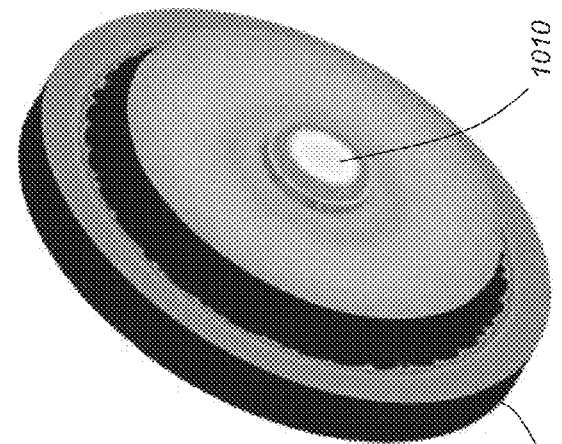
FIG. 10E
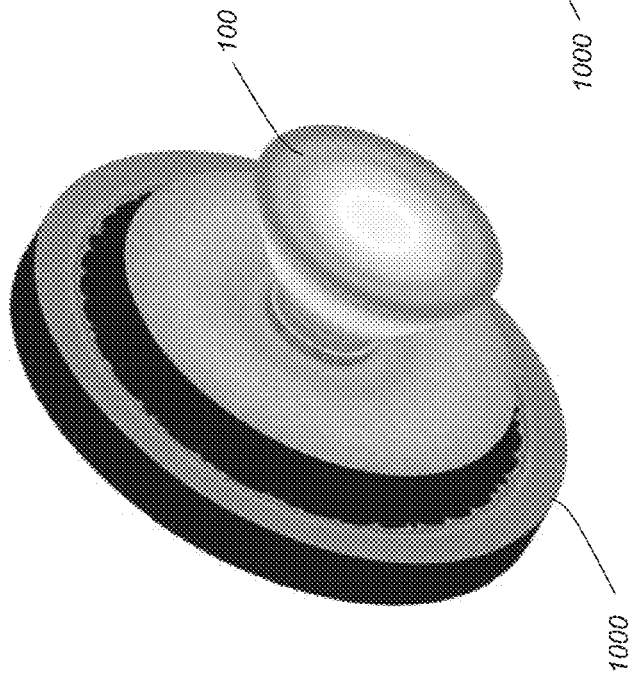
FIG. 10F

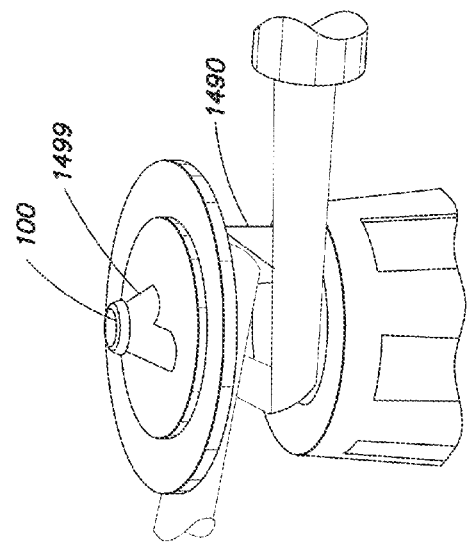
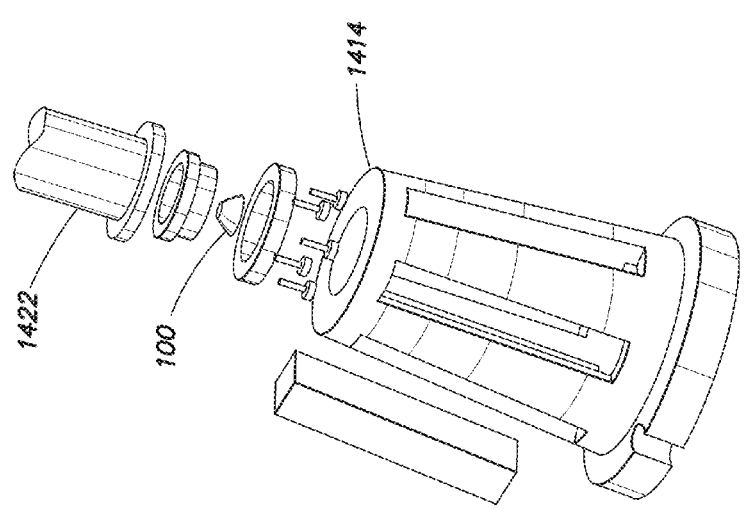
FIG. 15C
FIG. 15B

METHODS, SYSTEMS, AND APPARATUS FOR HIGH ENERGY OPTICAL-PULSE AMPLIFICATION AT HIGH AVERAGE POWER

CROSS-REFERENCE TO RELATED PATENT APPLICATIONS

This application claims the benefit, under 35 U.S.C. §119(e), of U.S. Provisional Application No. 61/645,721, filed May 11, 2012, which application is hereby incorporated herein by reference in its entirety.

This application also claims the benefit, under 35 U.S.C. §119(e), of U.S. Provisional Application No. 61/761,360, filed Feb. 6, 2013, which application is also hereby incorporated herein by reference in its entirety.

BACKGROUND

High-peak-power pulsed lasers that operate at high repetition rates enable optical parametric chirped-pulse amplification (OPCPA) for high-harmonic generation (HHG). This HHG can be used for tabletop generation of coherent x-rays, generating seeds for free-electron lasers, high-brightness photo-injection for advanced accelerators, and laser-wakefield acceleration. They can also enable industrial applications including but not limited to laser peening for strengthening metal parts, percussion drilling of deep holes in superalloys used in turbine blades, and forming aerodynamic surfaces from thick metal sections used for wings in the aerospace industry and many other industrial applications.

In HHG, an intense laser beam, such as a pulse train emitted by an OPCPA, illuminates an atomic medium, which emits all of its odd harmonics of the laser frequency (up to some cutoff order) in the forward direction. These harmonics, which have comparable efficiency, may be used for high-harmonic spectroscopy and for photolithography. HHG driven by long wavelengths (e.g., about 2-5 µm) extends the high harmonics' cutoff order to the water-window and even to the keV regions of the electromagnetic spectrum thanks in part to pump laser technology based on optical parametric amplification (OPA) and OPCPA. (As understood by those of skill in the art, the water window is a band of the electromagnetic spectrum that stretches from the K-absorption edge of oxygen at a wavelength of about 2.34 nm (530 eV) to the K-absorption edge of carbon at about 4.4 nm (280 eV). Water is relatively transparent to radiation in this band.)

Phase-matched HHG at high photon energies has been experimentally demonstrated using a 10 Hz, multi-millijoule, 1.5 µm to 2 µm OPA source and a 20 Hz, multi-millijoule, 3.9 µm OPCPA source. The number of the soft X-ray photons generated per second over 1% bandwidth, however, is still as low as $10^6$ to $10^7$, limiting the usefulness of the existing OPA and OPCPA sources.

Laser wakefield acceleration involves using high-intensity laser pulses to generate a plasma for accelerating electrons. Illuminating the plasma with a laser pulse creates a wave that propagates through the plasma at a speed near light speed. As this wave propagates, it displaces background electrons through the ponderomotive force (or light pressure) of the laser. For large enough plasma waves, electrons in the background plasma can be trapped and accelerated by the waves' longitudinal electric fields to very high energies over very short distances. The accelerated electrons can be used to form an energetic electron beam suitable for radiography, radioisotope production, nuclear physics, and possibly the transmutation of nuclear waste Laser peening, or laser shock peening, is a process for hardening or peening metal that involves using short pulses of laser light to improve the fatigue resistance of a piece of metal, such as a turbine blade in a jet engine. Focusing the pulses on an ablative coating, such as absorptive paint or tape, on the metal's surface causes the coating to explode, which produces a shock wave that compresses the metal. At high enough irradiances (e.g., 10 GW/cm$^2$), the pulses create pressures that plastically yield metal surfaces, leaving deep levels of compressive stress or desired plastic strain in the metal. This deep compressive stress improves the metal's fatigue resistance.

SUMMARY

Embodiments of the present invention include an optical gain media and methods of amplifying optical beams using optical gain medium. An exemplary optical gain medium includes a gain layer with a first refractive index and an index-matched layer, bonded to the gain layer, with a second refractive index that is substantially equal to the first refractive index. This exemplary optical gain medium has an exterior surface that is at least partially defined by revolving a two-dimensional curve, such as a parabola, about the longitudinal axis of the optical gain medium. In operation, photons emitted spontaneously the gain layer may be ejected from from the composite optical gain medium via the exterior surface.

Another exemplary optical gain medium comprises a gain layer having a first refractive index, an index-matched layer having a second refractive index substantially equal to the first refractive index, and at least one scattering center. The index-matched layer is bonded to the gain layer, and the scattering center is disposed within the gain layer, to scatter at least one photon generated by fluorescence within the gain layer. If desired, this exemplary optical gain medium may also have an exterior surface that is at least partially defined by revolving a two-dimensional curve, such as a parabola, about the longitudinal axis of the optical gain medium.

Embodiments of the present invention also include a system for producing at least one amplified optical pulse. In one example, the system comprises an optical source, a composite optical gain medium in optical communication with the optical source, and a cooling device in thermal communication with the composite gain medium. In operation, the optical source generates the pulse, and the composite optical gain medium amplifies the optical pulse so as to produce the amplified optical pulse. The cooling device cools the composite optical gain medium during amplification. The composite optical gain medium has a longitudinal axis and an exterior surface at least partially defined by revolving a two-dimensional curve about the longitudinal axis.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A, 1B, and 1C are perspective, plan, and profile views, respectively, of a composite optical gain medium according to embodiments of the present invention.

FIGS. 2A and 2B illustrate fluorescence generation, amplification, and ejection in a thin-disk gain medium and in the composite optical gain medium of FIGS. 1A-1C, respectively.

FIGS. 3A-3D illustrate the fluorescence flux distribution in the composite optical gain medium of FIGS. 1A-1C.

FIG. 6A shows an ASE-limited aperture for a faceted composite optical gain medium.

FIG. 6B shows a monolithic array of gain islands (cells) formed in a single crystal using scattering lines according to embodiments of the present invention.

FIG. 7A is a flow diagram that illustrates a process for making a composite optical gain medium with a curved exterior surface according to embodiments of the present invention.

FIG. 7B is a flow diagram that illustrates a process for making a composite optical gain medium with scattering centers in the gain layer according to embodiments of the present invention.

FIGS. 7C and 7D are exploded and plan views, respectively, of a coating mask suitable for holding a composite optical gain medium during the coating process in FIGS. 7A and 7B.

FIGS. 10A and 10B are exploded and perspective views, respectively, of a composite optical gain medium coupled to a heat-spreader via an indium disk according to embodiments of the present invention.

FIGS. 10C and 10D are profile and plans views, respectively, of the heat-spreader of FIGS. 10A and 10B.

FIGS. 10E and 10F illustrate the fluorescence flux on the heat-spreader of FIGS. 10A-10D with and without, respectively, the composite optical gain medium when excited with a 400 W source.

FIGS. 15A-15C are diagrams of an angled, rotationally symmetric mirror mount shown in FIG. 14A.

DETAILED DESCRIPTION

Figure 2C:
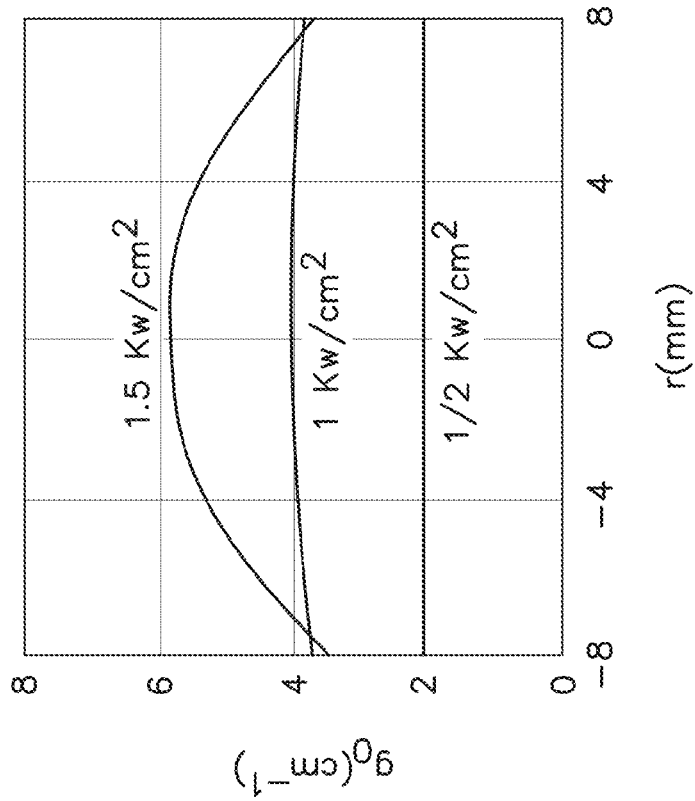
FIGS. 2C and 2D are plots of the small signal gain coefficients versus radius of the gain media in FIGS. 2A and 2B, respectively.

Embodiments of the present invention include composite optical gain media and high-power optical amplification systems suitable for driving optical parametric amplifiers, optical parametric chirped pulse amplifiers, high-harmonic generation, laser-wakefield acceleration, free electron laser seeding, percussion drilling, metal forming, laser peening and more. Some examples of these embodiments can be used to produce pulsed laser beams with repetition rates on the order of kilohertz and peak intensities on the order of Gigawatts using one or more composite optical gain media cooled to temperatures of about 50 K to about 200 K (e.g., about 60 K to about 120 K, or 77 K). (Of course, room-temperature operation is also possible, as is non-cryogenically refrigerated operation, especially for applications that benefit from higher bandwidths (shorter pulses) or operation without cryogenic cooling.) These composite optical gain media eject unwanted fluorescence by reflection or scattering off a specially shaped (e.g., parabaloidal) exterior surface and/or via scattering off embedded scattering centers. In one exemplary amplification system, the composite optical gain media are disposed in an image-relayed, multi-pass architecture that operates with passive optical isolation.

Composite Optical Gain Media with Curved Exterior Surfaces

FIGS. 1A-1C show a composite optical gain medium 100 with a curved exterior surface 102 shaped to eject unwanted fluorescence photons. The composite optical gain medium 100 offers several advantages over conventional thin-disk optical gain media. For instance, it does not deform easily, it can store large amounts of energy when amplifying pulsed laser beams, and its larger volume dilutes amplified spontaneous emission (ASE). This dilution of ASE results in higher gain, which in turn enables larger apertures, greatly enhancing the energy available from a single aperture—the ASE limited aperture.

The composite optical gain medium's curved exterior surface 102 may be at least partially defined by rotating a two-dimensional curve, such as a parabola, hyperbola, or other curve of order ≥2, about the optical gain medium's optical axis 101 (FIG. 1C). For instance, the exterior surface 101 may be shaped liked a complex parabolic concentrator (CPC) fashioned to eject fluorescence from the composite optical gain medium 100. In other words, the composite optical gain medium 100 may be a paraboloid frustum. In the example shown in FIGS. 1A-1C, the exterior surface 101 is defined by a second-order curve written in cylindrical coordinates as $R(z)=2.25+0.84z-0.04z^2$, where the origin is located at the center of reflective surface 112 (described below). The exterior surface's exact shape may be determined with a Monte-Carlo ray-trace based on the composite optical gain medium's refractive index, the pump wavelength, the emission wavelength, and/or the fabrication process(es) used to make the composite optical gain medium 100.

The optical gain medium 100 includes a gain layer 110 that is indium-bonded to a cap (layer) 120 whose refractive index is substantially equal to that of the gain layer 110 (e.g., within ±0.05, ±0.01, or ±0.005). For instance, the gain layer 110 may include a crystal host doped with one or more ions, such as Yb:YAG, Yb:YLF, Nd:YAG, Yb:LuAG, Yb:SrF$_2$, Tm:YAG, Yb:GGG, Yb:KYW, Yb:KGW, Yb:KLuW, Yb:Lu$_2$O$_3$, Yb:Y2O3, Yb:S-FAP, and Yb:Calgo. The index-matched cap 120 may include the same crystal host without the dopant(s), e.g., YAG, YLF, LuAG, SrF$_2$, GGG, KYW, KGW, KLuW, Lu$_2$O$_3$, Y$_2$O$_3$, S-FAP, or Calgo. Because the cap's refractive index is substantially equal to that of the gain layer 110, it provides an escape valve for spontaneous emission in the gain layer 110 that would otherwise limit the maximum gain and/or stored energy.

The gain layer 110 defines a reflective surface 112 that is normal to the optical gain medium's optical axis 101 (FIG. 1C) and contiguous with the exterior surface 102, which reflects fluorescence away from the gain layer 110. The gain layer 110 may have a thickness anywhere from about 0.01 mm to about 1.0 mm (e.g., 1 mm as shown in FIG. 1C) and a maximum outer diameter of about 1.0 mm to about 100 mm. The gain layer's minimum outer diameter may be about 0.5 mm to 99.5 mm (e.g., 4.5 mm as shown in FIG. 1C). In some cases, the gain layer's size may be limited only by fabrication and availability of suitable crystal sizes. The index-matched cap 120 has a thickness of about 1.0 mm to about 30.0 mm (e.g., 4.0 mm as shown in FIG. 1C) and a maximum outer diameter of about 1.0 mm to 70.0 mm. The index-matched cap's minimum diameter matches the gain layer's maximum diameter as shown in FIGS. 1A-1C.

The reflective surface 112 may be coated with a high-reflectivity (HR) coating 114, which in turn may be coated with a protective coating 116, such as sputtered Al$_2$O$_3$. In some embodiments, the HR coating 114 comprises a Layertec "thin-disk" coating with low thermal impedance and a high damage threshold (e.g., about 20 J/cm$^2$ to about 100 J/cm$^2$). The HR coating 114 may have a reflectivity $R_u$>99.97% at a wavelength of 1030 nm, a temperature of 77 K, and an angle of incidence of 10°±1°. The HR coating's reflectivity may be about $R_u$>98% at wavelengths of 1030 nm and 940 nm, a temperature of 77 K, and angles of incidence ranging from 0°-180°. The HR coating 114 may extend over the entire area of the reflective surface 112 and may also spill over onto a shoulder extending up to about 0.5 mm along the curved exterior surface 102.

Similarly, the index-matched cap 120 defines an input/output surface 122 that is also normal to the optical axis 101 (nominally parallel to the reflective surface 112) and contiguous with the exterior surface 102. In some cases, the reflective surface 112 and the input/output surface 122 may form a small wedge (e.g., about 1 mrad to about 3 mrad) to defeat "etalon" effects. The input/output surface 122 may be coated with a dichroic anti-reflection (AR) coating 124 that has a high damage threshold and transmits light at both the pump wavelength and the emission wavelength. For instance, the AR coating 124 may have a transmissivity $T_u$>99.9% at a wavelength of 1030 nm, a temperature of 77 K, and an angle of incidence of 10°±1°. The AR coating's transmissivity may be about $T_u$>98.5% at wavelengths of 1030 nm and 940 nm, a temperature of 77 K, and angles of incidence ranging from 0°-18°. The AR coating 124 may extend over 95% or more the entire area of the input/output surface 122.

In operation, the pump beam (not shown) and the signal beam (not shown) enter the composite optical gain medium 100 via the input/output surface 122. The pump and signal beams propagate through the index-matched cap 120 to the gain layer 110, possibly reflecting off the internal side of the exterior surface 102. The gain layer 110 transfers power from the pump beam to the signal beam by the process of stimulated emission of radiation. The amplified signal beam reflects off the reflective surface 112, then propagates out of the composite optical gain medium 100 via the index-matched cap 120 with possible additional reflections off the internal side of the exterior surface 102.

Amplified Spontaneous Emission (ASE) in Composite Optical Gain Media

The gain layer 110 may also fluoresce in response to absorption of the pump beam. Unless ejected from the gain medium 100, this fluorescence (spontaneous emission) limits the gain experienced by the signal beam. In a conventional thin-disk gain medium, the spontaneously emitted photons reflect off the gain medium's flat internal surfaces. This traps the photons in the gain medium, where they become amplified as they make repeated trips through the gain medium. The resulting ASE consumes power that would otherwise amplify the signal beam and cause unbalanced heating of the gain medium, leading to thermally induced changes in the gain medium's refractive index. These refractive index changes may in turn cause unwanted aberrations to appear in the signal beam and limit the usable portion of the gain medium's surface to an ASE-limited aperture whose diameter may be about 50% to about 90% of the index-matched layer's maximum diameter. Because the power scales geometrically with aperture size, ASE limits the power by limiting the maximum aperture size.

FIG. 2A shows a traditional Yb:YAG thin-disk amplifier 210. An incident laser beam 201 propagates into the amplifier 210, where it is amplified before propagating out of the amplifier 210. Spontaneous emission from the amplifier 210 also becomes amplified to produce ASE 203. In some cases, up to 80% of spontaneous decay is trapped in the numerical aperture of the amplifier 210, depleting the amplifier's Yb$^{3+}$ excited states and limiting the gain/energy-storage available for the laser beam 201.

FIG. 2B shows amplification of an incident laser beam 101 using the composite optical gain medium 100 of FIGS. 1A-1C. The gain medium 100 amplifies the laser beam 101, which is reflected back out into free space. The gain layer 110 also spontaneously emits some photons, which may be amplified and ejected from the gain medium 100 as ASE 103. In the composite optical gain medium 100, however, index-matching allows the majority of the spontaneous emission to escape the gain 110 layer. In addition, the gain medium's geometry causes ejection of most of the ASE 103 (e.g., >90%), which enables higher gain/energy-storage and a larger aperture.

Figure 2D:
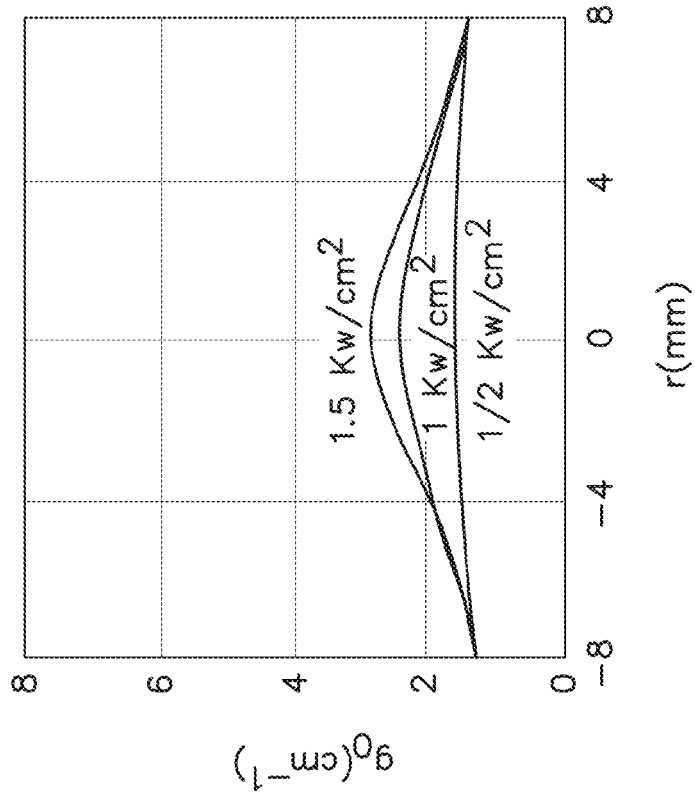

FIGS. 2C and 2D are plots of the calculated small signal gain coefficient $g_0$ versus gain medium radius at three different pump intensities for the traditional thin disk gain medium 210 (FIG. 2A) and the composite optical gain medium 100 (FIG. 2B). for the same pump intensities. They show that the composite optical gain medium 100 has peak small signal gain that is twice as great as that of the thin-disk gain medium 210. And the relative peak widths in FIGS. 2C and 2D show that the composite optical gain medium 100 has a greater ASE-limited aperture than the traditional thin disk gain medium 210.

Figure 3D:
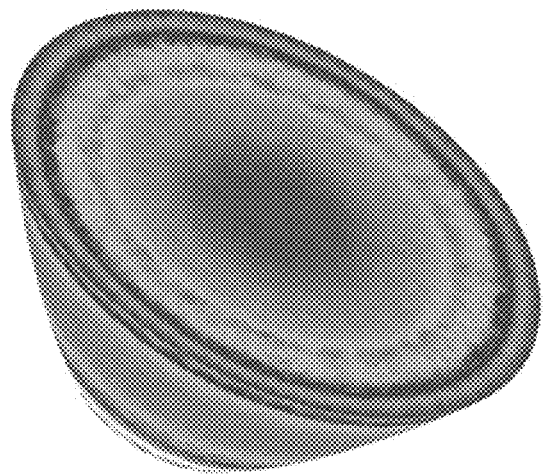
Figure 3C:
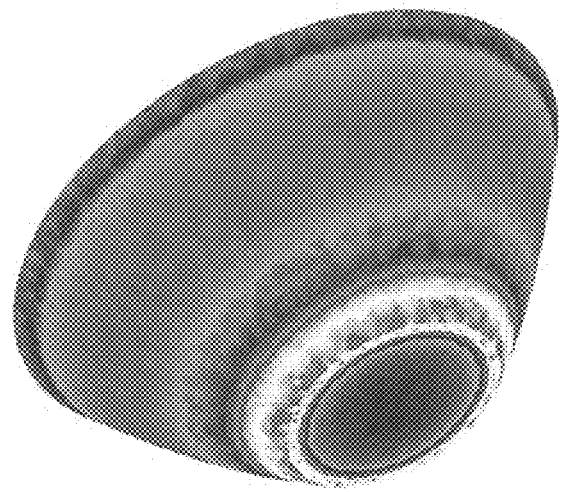

FIGS. 3A-3D are diagrams that illustrate the fluorescence flux distribution of the composite optical gain medium 100 shown in FIGS. 1A-1C. FIGS. 3A and 3B represent the spontaneous emission collected by large spherical surfaces each centered on a fluorescence-rejecting composite gain medium. The spontaneous emission is emulated numerically as originating isotropically within the gain layer. FIGS. 3C and 3D are perspective views of the simulated fluorescence intensity transmitted through the composite gain medium's outer surface. Unlike a conventional thin-disk gain medium, which can trap up to 80% of spontaneously emitted photons, the composite optical gain medium 100 ejects >98% of spontaneously emitted photons.

FIGS. 3A-3D were produced with a Monte-Carlo non-sequential ray-trace computer program used to determine the shape of the composite gain medium. The curved portion of the outer surface was varied (e.g., as shown in FIG. 4B, described below) and collection statistics on the far-field sphere surface of FIGS. 3A and 3B as well as the intensity in the near-field surface distribution FIGS. 3C, 3D, 4C and 4D were used to evaluate the performance of the different surface shapes as described below.

Figure 4B:
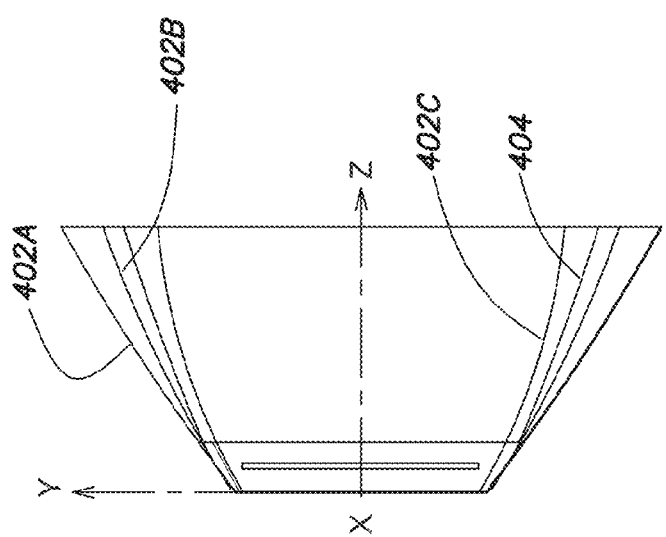
FIG. 4B illustrates profiles of composite optical gain media according to embodiments of the present invention.
Figure 4A:
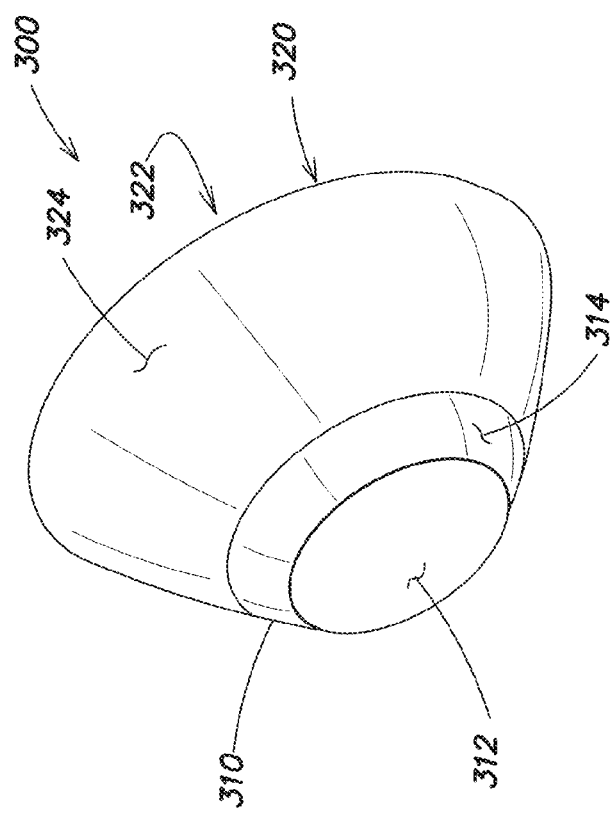
FIG. 4A is a perspective view of another composite optical gain medium according to embodiments of the present invention.

FIGS. 4A-4D illustrate aspects of a process for designing a composite optical gain medium like the one shown in FIGS. 1A-1C to reduce or possibly minimize ASE. To start, consider a composite optical gain medium 300 as shown in FIG. 4A. This composite optical gain medium includes a gain layer 310, which defines a reflective surface 312 and a first angled surface 314, bonded to an index-matched cap 320, which defines an input/output surface 322 and a second angled surface 324. The index-matched cap 320 provides an index-matched volume that dilutes fluorescence from the gain layer 310. And the angled surfaces 314 and 324 at the edges reflect or refract the fluorescence out of the optical gain medium 300, avoiding recirculation of spontaneously emitted light.

Smoothing the angled surfaces 314 and 324 into a curved exterior surface (e.g., surface 102 shown in FIGS. 1A-1C) further reduces recirculation of spontaneously emitted light. The exact shape of the curved exterior surface can be determined using a predictive ASE code to maximize the aperture and gain. In this approach, the amplified fluorescence is considered to exit the edges of a disk-shaped gain-sheet with no re-entry. The design process can be cast as the determination of the power in a pair of counter-propagating fluorescent seeds passing through a statistically weighted length of the gain layer. (This length can be treated as a one-dimensional gain-guide.) If the gain layer is a two-level system, its upper-level population $n_2$ and lower-level population $n_1$ can be weighted by Boltzman occupation factors $f_k$ that exist in equilibrium with the pump beam and the counter-propagating fluorescent beams that grow from the fluorescent seeds. The seeds' power is found by integrating the fluorescence captured within a three-dimensional "view-factor" from a differential element of the gain layer and from symmetry considerations.

FIG. 4B illustrates profiles 402a, 402b, and 402c (collectively, profiles 402) of several composite optical gain media with curved exterior surfaces superimposed on a profile 404 of a composite optical gain medium with an angled or faceted exterior surface. Because the heuristic model (described above) assumes no re-entry for the spontaneous emission, each gain medium must be shaped so as to eject fluorescence that reaches its edges. Thus, each gain medium's edges are fashioned to reflect the fluorescence away from the bottom (where the gain layer is located) and out of the gain medium via the index-matched cap. Each gain medium's shape can be changed so as to reduce the captured fluorescence, e.g., using a Monte-Carlo ray-trace technique. In some cases, a gain medium may be shaped like a complex parabolic concentrator, such as those used in solar concentrators or collectors.

Figure 4C:
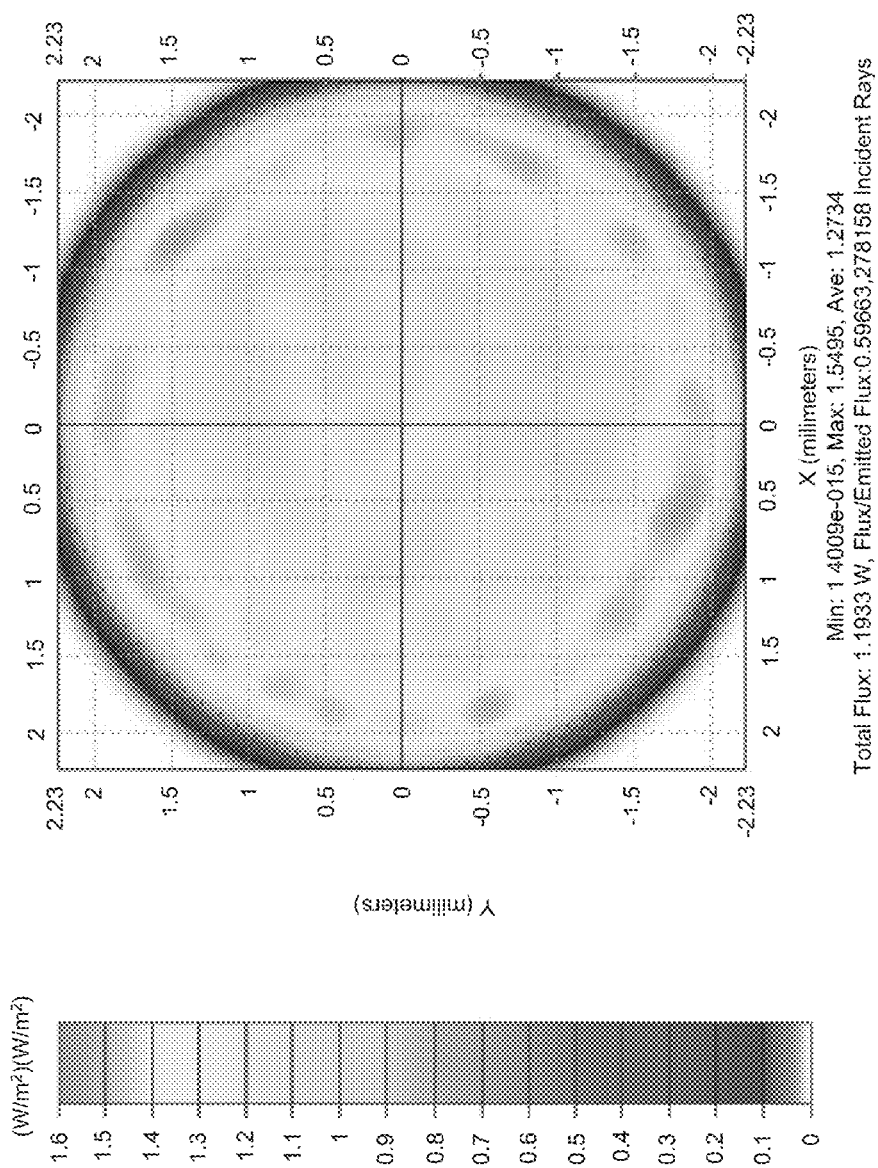
FIGS. 4C and 4D are plots of the flux distribution as a function of transverse coordinate of a composite optical gain medium according to embodiments of the present invention.
Figure 4D:
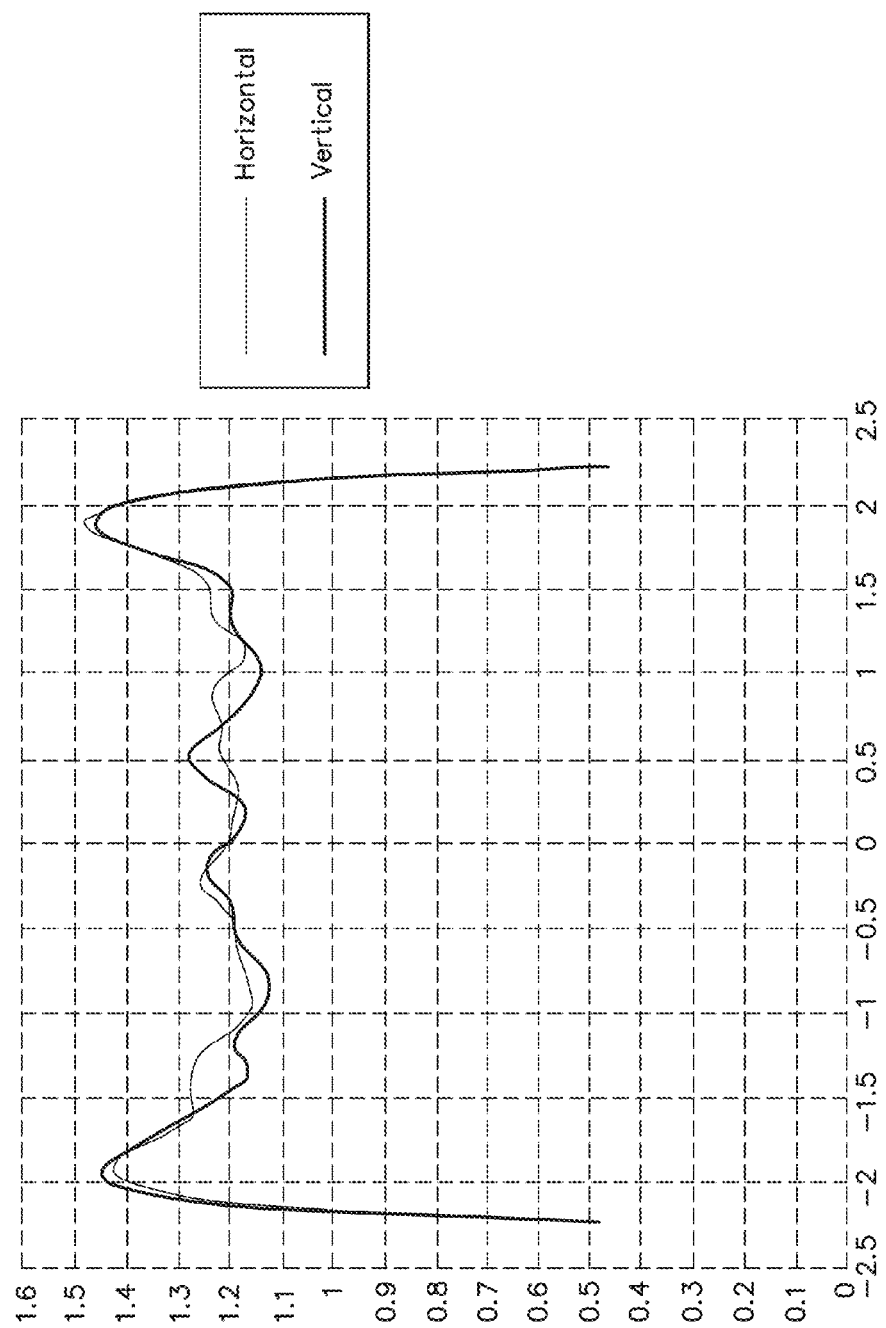

FIGS. 4C and 4D are plots of the flux distribution through the input/output surface 122 of the optical gain medium 100 shown in FIGS. 1A-1C. FIG. 4C represents the flux distribution as a function of transverse coordinate. In this example, the maximum flux is about 1.55 W/m$^2$, the average flux is about 1.27 W/m$^2$, the total flux is about 1.19 W, and the ratio of flux to emitted flux in about 0.60. FIG. 4D represent slices of the plot in FIG. 4C—it shows the flux distribution versus radial coordinate along the horizontal and vertical axes in FIG. 4D. The flux across the center of the input/output surface 122 is fairly constant. The flux increases near the edges of the output surface 122 due to ejection of fluorescent photons.

Composite Optical Gain Media with Scattering Centers

As explained above, fluorescent photons propagating away from the gain layer 110 travel into the undoped, index-matched cap 120 and reflect or refract out of the composite optical gain medium 100 regardless of aperture size. However, a small fraction of spontaneously emitted photons may propagate in the plane of the gain layer 120 along "ballistic" trajectories. That is, these ballistic photons may make many passes through the gain layer 120 and, in some cases, may never escape from the gain layer 120. These ballistic photons are amplified with each pass through the gain layer 120, producing ASE that may limit the maximum diameter of composite optical gain medium 100.

Figure 5A:
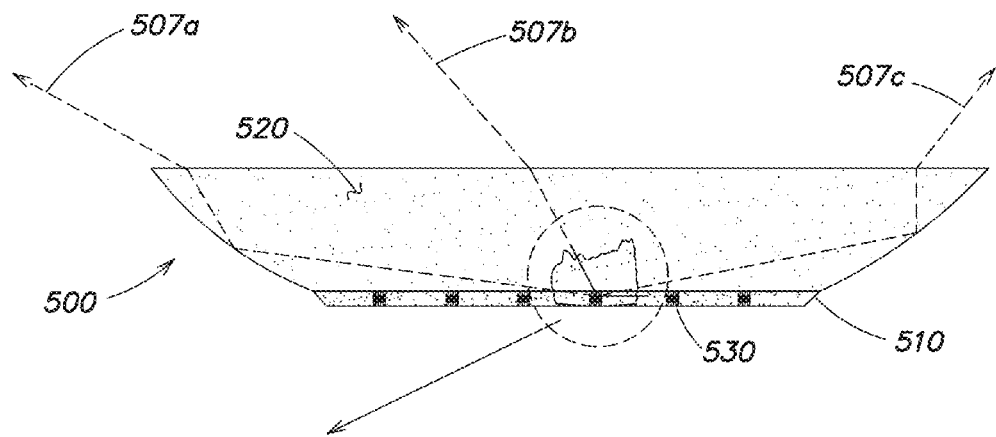
FIGS. 5A and 5B illustrate a composite optical gain medium with scattering centers in the gain layer to eject ballistic (transverse) ASE photons according to embodiments of the present invention.
Figure 5B:
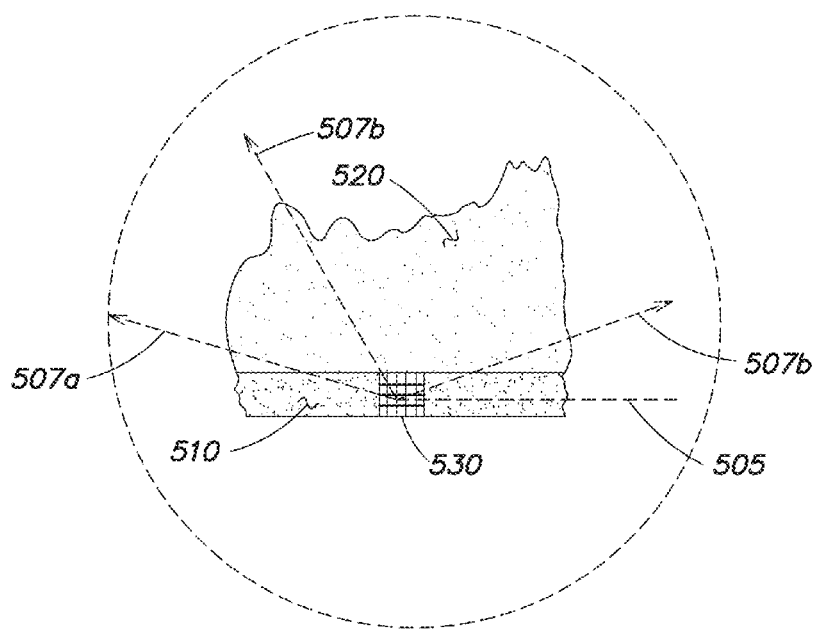

FIGS. 5A and 5B show a composite optical gain medium 500 that includes one or more scattering centers 530 to inhibit ASE caused by ballistic photons. Like the other composite optical gain media disclosed herein, this composite optical gain medium 500 includes a gain layer 510 bonded to an index-matched cap 520. If desired, the exterior surface of the composite optical gain medium 500 may be shaped to eject non-ballistic fluorescent photons, e.g., as shown in FIGS. 1A-1C. Thanks to the scattering centers 530, ASE from ballistic photons does not limit the aperture size of the composite optical gain medium 500 shown in FIGS. 5A and 5B.

The scattering centers 530 may be index perturbations disposed in the volume of the gain layer 500 or defects in the gain layer's crystalline structure (e.g., point or lattice defects). They can be written directly written into the gain layer 510 by a femtosecond laser. When one or more ballistic photons 505 propagates into a scattering center 530, the scattering center 530 scatters or refracts the ballistic photons 505 into any one of several directions, such as directions 507a, 507b, or 507c (collectively, directions 507) shown in FIGS. 5A and 5B. The ballistic photons 505 travel in these directions 507 out the gain layer 510 and into the index-matched cap 520, where they refract and/or reflect out of the composite optical gain medium 500.

The scattering centers 530 can be disposed in periodic or aperiodic (e.g., random) patterns within the gain layer 510. For instance, the scattering centers 530 could appear as point index perturbations distributed throughout the gain layer 510 on a two- or three-dimensional lattice (e.g., a square lattice, rectangular lattice, hexagonal lattice, or cubic lattice). They could also be scattered randomly throughout the volume of the gain layer 510 or distributed more densely in areas where spontaneous emission or temperature is highest.

The scattering centers 530 may also comprise line, area, volume index perturbations. For instance, the scattering centers 530 can be written into strategic patterns that define gain-islands 612 of smaller diameter than the ASE-limited aperture described above. As shown in FIG. 6A, ASE limits the effective aperture 602 of a composite thin-disk amplifier 600 that delivers about 4 J per pulse at a pulse repetition rate of 500 Hz to an indiameter of about 2.5 cm. This limited imposed by ASE can be circumvented by creating a pattern of gain islands (gain cells) 612, each of which is no larger than the ASE-limited aperture 602, in a larger crystal. For instance, a these gain islands 612 can be defined by a hexagonal pattern 630 of index perturbations (scattering centers) as shown in FIG. 6B. This hexagonal pattern 630 would occupy approximately 1% of the aperture area. Assuming a diffusion-bonded crystal with a maximum transverse dimension of 10 cm, it is possible to create 19 groove-isolated, 2.5 cm apertures, which could operate together to produce 50 J per pulse at pulse repetition rate limited by the backplane cooling (e.g., liquid nitrogen intensive cooling).

Composite Optical Gain Media Materials

As mentioned above, materials suitable for the composite optical gain media disclosed herein include crystal hosts, such as yttrium aluminum garnet (YAG) or yttrium lithium fluoride (YLF), doped with rare-earth ions, such as ytterbium. Materials doped with ytterbium have been demonstrated as excellent gain media for ultrashort pulse, high-average power applications. The small quantum defect introduced by the ytterbium dopants minimize the heat load on the material, and the availability of high brightness pump diodes at ytterbium's excitation wavelength allows for scaling to high power. Other laser-active dopants for solid-state laser materials such as neodymium, erbium, holmium, and chromium can also be used in exemplary gain media. Although these ions may result in higher quantum defect levels and higher heat loads than ytterbium, they may be useful for amplifying light at wavelengths outside ytterbium's gain band. For example, holmium may be useful for eye-safe operations at wavelengths of around 2 microns.

Ytterbium ($Yb^{3+}$) is a particularly suitable dopant for gain layer of inventive composite optical gain media, especially when doped into a crystal host with desirable intrinsic thermal properties. The thermo-optic properties of many rare-earth hosts depend on temperature and improve as the hosts are cooled to cryogenic temperatures. For example, in Yb:YAG the thermal conductivity increases several-fold, whereas dn/dT and the coefficient of thermal expansion both decrease several-fold at liquid nitrogen temperatures. These changes can be characterized by a figure of merit defined as:

$$FOM = \frac{k\lambda}{\chi_{QL}(dn/dT)},$$

where k is the thermal conductivity, $\lambda$ is the wavelength, $\chi_{QL}$ represents the quantum-limited thermal load, and dn/dT is the thermo-optic coefficient. This figure of merit is based on the optical path length distortion and is defined from these material properties and the quantum-limited thermal dissipation for the dopant-ion. It represents the laser power available per unit of optical path-length difference (OPD) at the operating temperature.

TABLE 1

Material Thermal Properties

| Material | Yb:YAG | Yb:YLF | Nd:YAG |
|---|---|---|---|
| Temperature | 100 K | 100 K | 300 K |
| Figure of Merit (relative to Nd:YAG) | 97 | 187 | 1 |
| Quantum-limited thermal load $\chi_{QL}$ | 9.6% | 5.9% | 32% |
| Thermal conductivity k (W/m · K) | 40 | 25 | 11 |
| Thermo-optic coeff. dn/dT (ppm/K) | 0.9 | −0.5 | 7.9 |
| Thermal expansion (ppm/K) | 2.0 | 2.3 | 6.2 |
| Emission bandwidth (nm) | 1.0 | 10 | 0.6 |

TABLE 1 gives thermal properties of Yb:YAG, Yb:YLF, and Nd:YAG including the figure of merit defined above. The figure of merit is normalized to Nd:YAG at room temperature, and shows that cryogenic Yb:YAG is able to deliver almost two orders of magnitude more laser power for the same amount of OPD. Yb:YLF provides another doubling relative to cryogenic Yb:YAG; moreover, its gain bandwidth is broader, which makes it suitable for supporting shorter output drive pulses.

In general, cryogenic cooling also causes the absorption and emission spectra to narrow, which leads to increases in the pump absorption coefficient and the stimulated emission cross section. This in turn leads to increased efficiency at cryogenic temperatures. Cryogenic cooling also reduces thermal excitation of the laser terminal level. The separation between the final state of the lasing transition and the ground state to 612 $cm^{-1}$, which is 3 kT at room temperature. With an energy difference this small, thermal excitation yields a significant thermal population in the final lasing state, leading to 3-level laser operation. At 100 K, however, these two states are separated by 8 kT, leading to more efficient 4-level laser operation. And at low temperatures, the emission cross-section increases compared to room temperature, which reduces the saturation fluence (e.g., to 1.3 $J/cm^2$). This allows efficient pulse extraction to take place even at low fluence, which reduces the risk of optical damage.

Fabrication of a Composite Optical Gain Medium

FIG. 7A illustrates a process 700 for making a composite optical gain medium with an exterior surface that is at least partially defined by revolving a two-dimensional curve, such as a parabola, about the composite optical gain medium's longitudinal (optical) axis. Starting materials for this process 700 include high-purity, laser-grade, single crystals without bubbles, inclusions, striations, birefringence, or other imperfections. For instance, the starting material may be a composite crystal "pre-form" that comprises two YAG crystals—a 10% Yb:YAG crystal and an undoped YAG crystal.

In step 702 of the process 700, these crystals are oriented with respect to each other before bonding. More specifically, the crystals are aligned such that the faces to be bonded are normal within ±5° to the crystalline ⟨111⟩ direction and rotated to within ±5° to the crystalline ⟨110⟩ direction. As understood by those of skill in the art, the exact crystal alignment depends in part on the symmetry point-group of the host material. For instance, YAG is substantially cubic and therefore (largely) isotropic, so it may be used in other alignments. In contrast, uniaxial materials, such as YLF and Yb:YLF, and biaxial materials, such as $CaF_2$, may be more sensitive to alignment.

Once the crystals are oriented with respect to each other, they are bonded together in step 704 to form a composite crystal. The interface between the crystals should be free of defects over at least about 90% of its area. If desired, the faces to be bonded may be ground and then polished to reduce the number of defects in the interface region. After bonding, the composite crystal is cut to the desired dimensions in step 706.

After the composite crystal is cut, its surfaces can be ground and polished. The input/output surface and the reflective surface are ground and polished to a high damage threshold, laser-grade finish in step 708. In some cases, this may be a flatness of $\lambda/10$ or better at $\lambda=632$ nm over the central 90% of each surface, a scratch/dig of 10/5 or better over the central 90% of each surface, and a parallelism within 30 seconds of arc. The exterior surface is ground and polished in step 710 to an inspection-grade finish with a tolerance of ±0.1 mm in the radial direction (i.e., normal to the composite crystal's longitudinal axis) and a scratch/dig of 10/5. The exterior surface may a have a fine-ground finish that extends over a band that is approximately 1 mm wide and contiguous with the input/output surface. The composite crystal's edges may also be chamfered (beveled), e.g., to form edges whose faces are between about 0.25 mm and about 0.35 mm wide. These chamfers may have minimal chipping, e.g., chipping with fragments no larger than 0.02 mm.

The input/output surface and the reflective surface are coated in step 712, possibly using the coating mask hardware 790 shown in FIGS. 7C and 7D. The composite optical gain medium 100 is secured with a series of concentric plates 792, 794, 796, and 798 to expose the reflective surface 112 and the input/output surface 122 without exposing the exterior surface 102. The reflective surface 112 receives a high damage-threshold HR coating (e.g., >10 J/cm$^2$, 10 ns) or higher with a reflectivity of R>99.7% at theta=10° for both ordinary and extraordinary polarizations. The input/output surface 122 receives a high damage-threshold AR coating (>10 J/cm$^2$, 10 ns or higher) that extends to within 0.5 mm of the surface's edge. These coatings may be applied with fully dense ion-beam sputtering, DC-Magnetron sputtering, or any other suitable coating technique that applies zero-void, fully-dense thin-films.

Once completed, the composite optical gain medium 100 may have a reflectivity at the interface between the 10% Yb:YAG sheet (the gain layer 110) and the undoped YAG block (index-matched cap 120) of <0.1% for a randomly polarized laser beam at $\lambda \approx 1$ µm that enters the medium 100 near normal through the input/output face 122, reflects off of the reflective face 112, and exit through the input/output face 122. The single-pass depolarization loss for the same laser beam may <1%.

FIG. 7B illustrates a process 750 for making a composite optical gain medium with scattering centers in the gain layer. As described above with respect to FIG. 7A, the process 750 begins with orientation 702 of an undoped crystal with respect to a doped crystal. The crystals are bonded together in step 704 to form a composite crystal, which is cut to the desired dimensions in step 756. If desired, the composite crystal may be cut into a cylindrical shape, a faceted shape, or a paraboloidal shape (e.g., as in step 706 of FIG. 7A). The composite crystal's input/output and reflective surfaces are ground and polished in step 708, and its exterior surface is ground and polished in step 760, e.g., into a shape defined by a two-dimensional curve (as in step 710 of FIG. 7A) or a straight line segment to form a cylinder or conical frustum. The composite crystal's input/output and reflective surfaces are coated in step 712 as described above. In step 764, the scattering centers are created in the gain layer, e.g., by focusing pulses from an ultrafast laser into the gain layer. Each pulse changes the gain layer's index of refraction at its respective point of focus without damaging the region of gain layer (or index-matched cap) surrounding the point of focus.

Heat Generation and Dissipation in Composite Optical Gain Media

Figure 8:
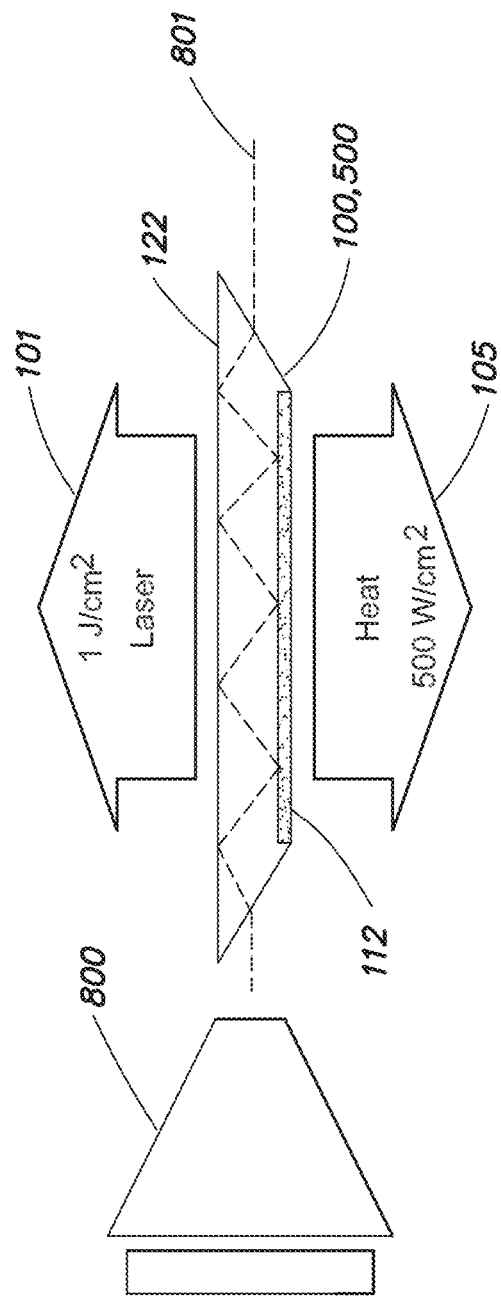
FIG. 8 illustrates pumping and heat generation of a composite optical gain medium according to embodiments of the present invention.

FIG. 8 illustrates optical pumping, amplification, and heat flow in an inventive composite optical gain medium (e.g., gain media 100 and 500 shown in FIGS. 1A and 5A, respectively). An optical pump source 800, such as a diode laser, emits a pump beam 801 that is coupled into the side of the gain medium 100, 500. At the same time, an incident laser beam 101 enters the gain medium's input/output surface 122, is amplified in the gain layer (not shown), reflected by the reflective surface 112, and exits via the input/output surface 122. In some cases, the laser beam's energy per area may be about 1 J/cm$^2$.

Amplification generates heat (e.g., about 500 W/cm$^2$) that flows out of the gain medium 100, 500 via the reflective surface 112. Although the gain media disclosed herein may be scaled to any of a variety of sizes, heat flux and one-dimensional thermal distribution (as well as laser fluence and pump intensity) may limit the gain medium's maximum practical size, pulse energy, and average power. Fortunately, larger sizes can be accommodated to some extent by proportional increases in aperture diameter, undoped cap thickness, and pump diode array size. However, the one-dimensional thermal distribution does not necessarily scale with size (it may be scale-invariant).

Figure 9A:
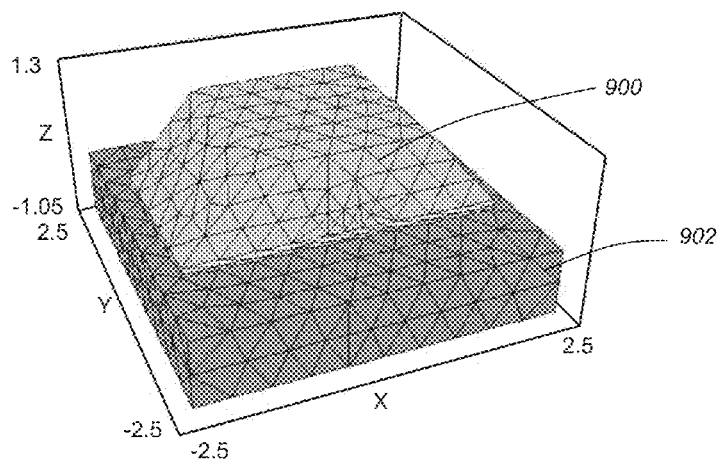
FIGS. 9A and 9B show a pyramidal frustum amplifier (gain medium) and a cylindrical amplifier (gain medium).
Figure 9B:
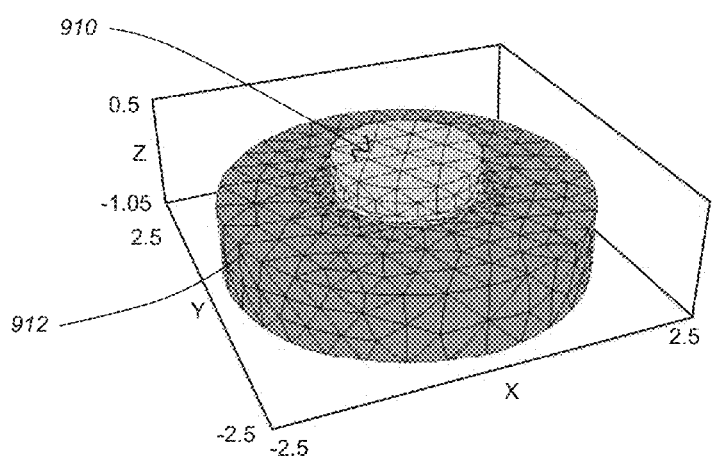
Figure 9C:
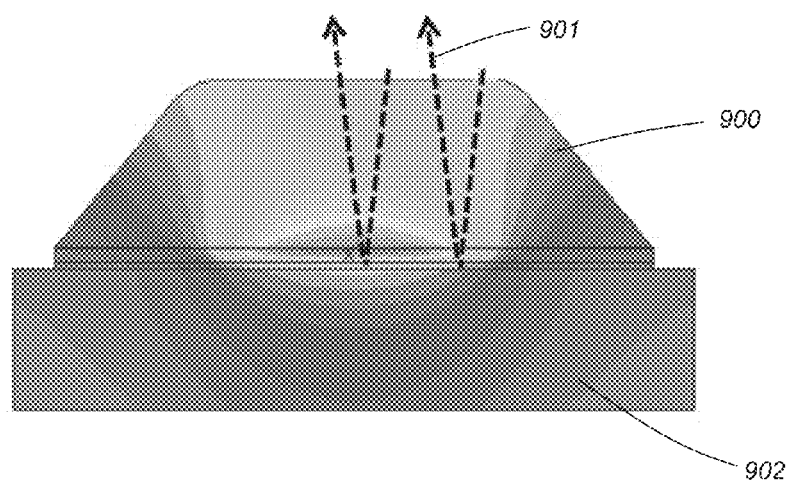
FIGS. 9C and 9D are plots of temperature distributions in the profiles of the amplifiers shown in FIGS. 9A and 9B, respectively.
Figure 9D:
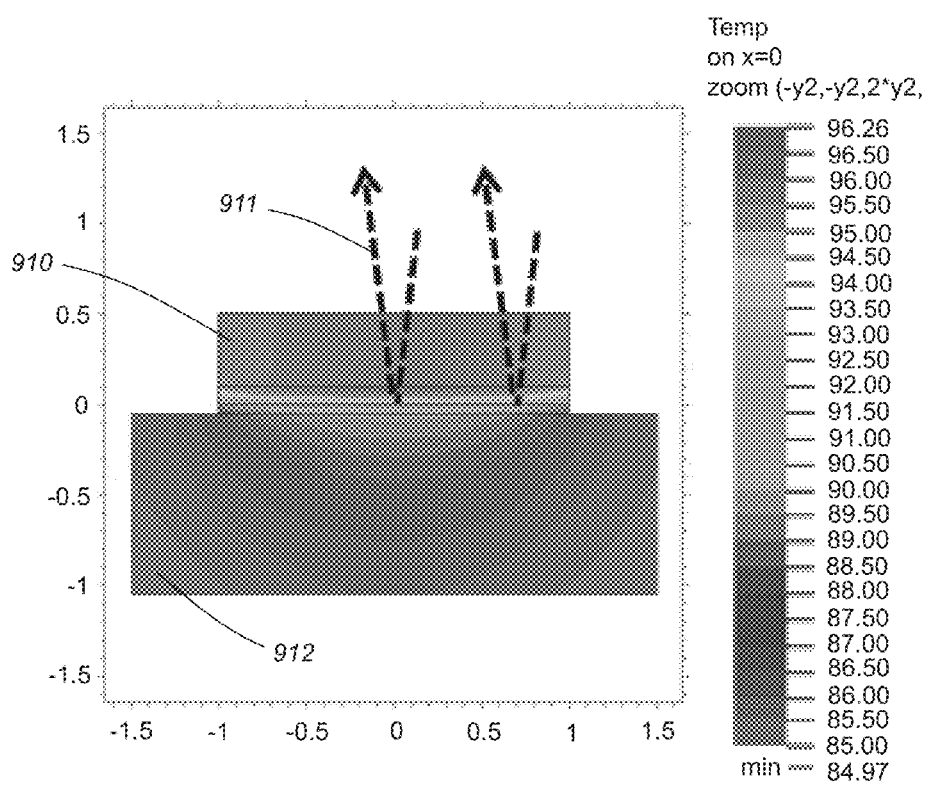

FIGS. 9A-9D show how unchecked distortions in average and peak power can become destructive following diffraction at apertures defined by thermal foot-prints from pumping or cooling non-uniformities or discontinuities. FIG. 9A shows a wedge-shaped (pyramidal frustum) amplifier 900 whose central region is pumped and whose entire bottom is cooled with a heat sink 902. FIG. 9C is a plot of the thermal distribution in the amplifier 900 and heat sink 912 of FIG. 9A as experienced by a laser beam 901 (dashed lines) undergoing amplification. It shows that the mismatch between the cooled and pumped areas may cause heat to flow transversely with respect to the pump beam, breaking the one-dimensional symmetry provided by the composite optical gain medium's thin-disk geometry.

The laser beam 901, which propagates substantially in the z-dimension, samples a temperature gradient that varies with x, y and z as a result of this broken one-dimensional symmetry. The amplifier's refractive index varies with temperature, so the temperature gradient induces an index gradient that distorts the laser beam 901: a central ray in the laser beam 901 experiences one optical path length within the amplifier 900, whereas a peripheral ray experiences a different optical path length within the amplifier 900.

FIG. 9B shows a cylindrical amplifier 910 whose entire area is pumped and whose entire bottom is cooled with a heat sink 912. Because the pumped and cooled regions substantially overlap (match), the cylindrical amplifier 910 presents nearly one-dimensional temperature and index profiles to an incident laser beam 911. (The temperature and index vary with z.) Because the index profile does not vary with transverse (radial) dimension, the laser beam's central and peripheral rays experience the same thermo-optical path length, which reduces beam distortions due to thermo-optic effects.

As mentioned above, efficient heat removal and mitigation of thermo-optic effects improve gain medium performance. Using a thin-disk geometry is one technique that provides for enhanced cooling. Operating at cryogenic temperatures also confers a number of advantages in thermal management as explained below. In Yb:YAG, for example, the thermal conductivity, thermal expansion coefficient, and thermo-optic coefficient (dn/dT) become significantly more favorable as the temperature drops to 77 K (liquid nitrogen temperature). Cyrogenic cooling also depletes the thermal population of the lower laser level, resulting in four-level rather than quasi-three-level operation. Heat sinking the composite optical gain medium also provides for efficient heat transfer from the active gain layer into the final heat-sink (the cryogen)

FIGS. 10A-10F illustrate a heat sink, or heat spreader 1000, suitable for use with inventive composite optical gain media. FIGS. 10A and 10B are exploded and perspective views, respectively, of the heat spreader 1000 coupled to the composite optical gain medium 100 of FIGS. 1A-1C via an indium disk 1010. FIGS. 10C and 10D show profile and plan views, respectively, of the heat spreader 1000. The heat spreader 1000 may be a cylinder formed of germanium, sapphire, or any other suitable material of similar expansion coefficient whose crystalline axis may be aligned with the cylinder's longitudinal axis, which is in turn aligned with the composite optical gain medium's optical axis. If desired, the heat spreader 1000 may be machined to form one or more concentric cylindrical pedestals, including a pedestal 902 whose diameter is slightly larger than the composite optical gain medium's minimum diameter. For instance, the pedestal 1002 may have a diameter of about 1.0 mm to about 50 mm (e.g., about 5 mm).

The indium disk 1010 is about 0.01 mm to about 1.0 mm thick and has a diameter about equal to the composite optical gain medium's minimum diameter, which may be about 0.5 mm to about 49.5 mm (e.g., about 4.5 mm). The indium disk 1010 couples the pedestal 1000 to the composite optical gain medium 100 so as to provide a path for heat to flow from the composite optical gain medium 100 to the heat spreader 1000. These pieces may be coupled together by melting or softening the indium, then pressing the composite optical gain medium 100 to the heat spreader 1000 without forming bubbles in the indium or spilling the indium. The thermal impedance of the resulting thermal bond may be about 0.025° C./(W/cm$^2$) or better. The thermal bond may also be stable enough to withstand cycling from room temperature to liquid nitrogen temperature and back about 1000 times or more without degradation of its thermal impedance or optical properties.

The HR coating 114 (FIG. 1A) on the composite optical gain medium 100 should be relatively impervious to the thermal contacting process. In some cases, the HR coating 114 may covered with a barrier layer or protective coating 116 (FIG. 1A) to prevent the composite optical gain medium's optical properties from corroding or degrading after the composite optical gain medium is soldered to the heat spreader 1000.

FIGS. 10D and 10F illustrate the calculated intensity of the fluorescence when a 400-Watt diode array is used to pump the composite gain medium 100 mounted via indium soldering on the heat spreader 1000. FIG. 10D shows the ensemble with the color bar code for the fluorescent intensity incident on the surfaces. In FIG. 10E, the composite gain medium 100 is hidden from view to reveal the area of maximum fluorescent flux situated in the area where the composite gain medium 100 contacts the indium solder 1010. 1000

Optical Amplification Systems with Composite Optical Gain Media

Figure 11:
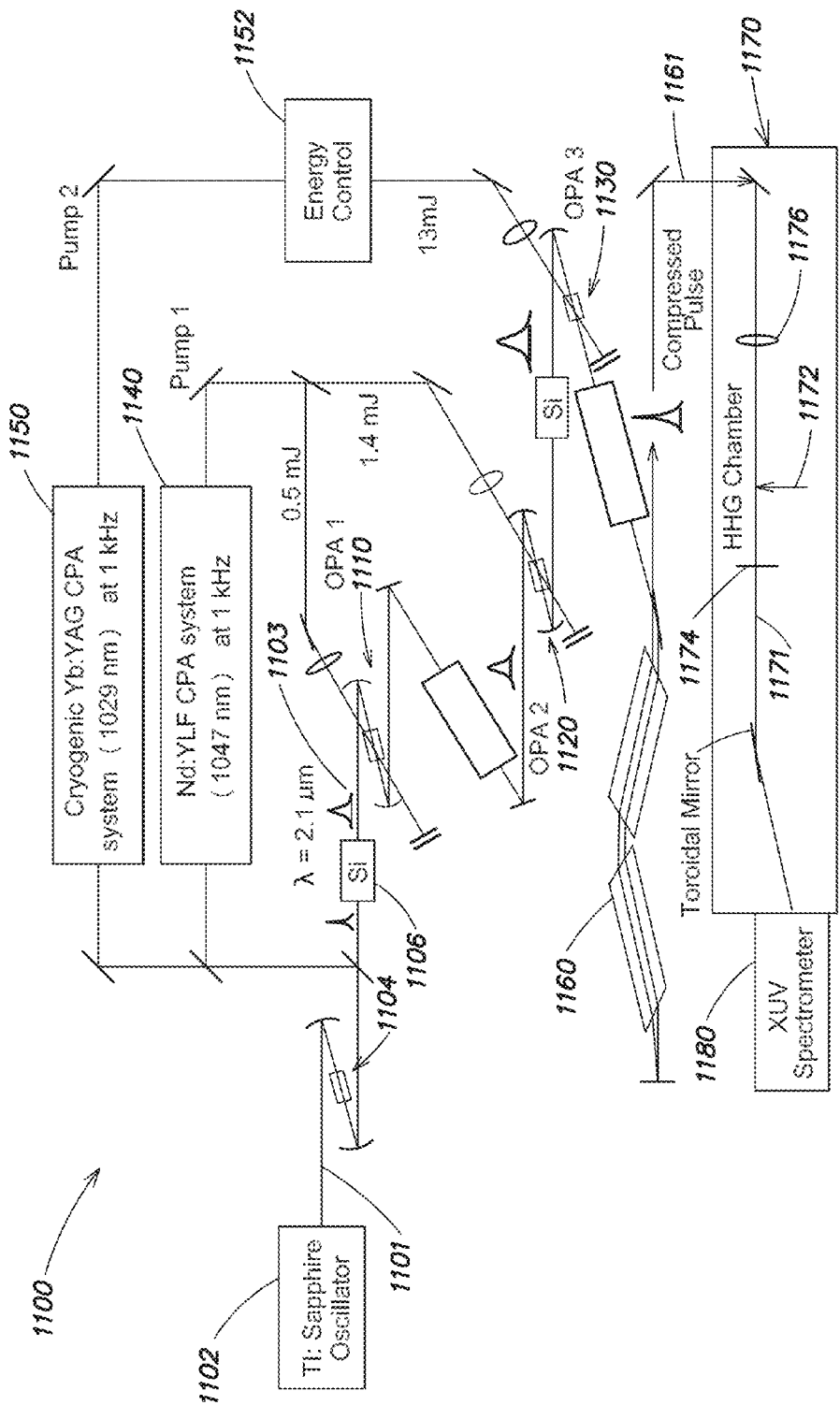
FIG. 11 is a schematic diagram of an ultra-broadband, carrier-envelope phase (CEP)-stable three-stage optical parametric chirped pulse amplification (OPCPA) system and high-harmonic generation (HHG) setup according to embodiments of the present invention.

FIG. 11 illustrates the optical layout an ultrabroadband, three-stage optical parametric chirped amplification (OPCPA) system 1100 with carrier-envelope phase (CEP) stabilization. The OPCPA system 1100 includes a pair of chirped pulse amplifiers (CPAs) 1140 and 1150, each of which may include an inventive composite optical gain medium that amplifies incident light. These CPAs 1140 and 1150 are used to produce an amplified pulse train at a wavelength of 2.1 µm that drives a high-harmonic generator 1170 to produce high harmonics in the ultraviolet and/or X-ray portions of the electromagnetic spectrum.

The OPCPA system 1100 includes a Ti:Sapphire oscillator 1102 that produces CEP-stable pulses 1101. For instance, the Ti:Sapphire oscillator 1102 may produce pulses 1101 at a pulse energy of 0.1 mJ to about 10 mJ, a pulse duration of about 0.1 ns to about 1 ms, and pulse repetition frequency of about 1 Hz to about 1 GHz. A separate f-2f CEP locking system 1190 (FIG. 12A) may lock the output pulses to a frequency-doubled reference using a stabilized cavity or other suitable reference signal source. These pulses propagate through an MgO-doped periodically poled lithium niobate (MgO:PPLN) crystal 1104 and silicon 1106 to yield seed pulses at a wavelength of about 2.1 µm through intra-pulse difference frequency generation. A first optical parametric amplifier (OPA) 1110 (also an MgO:PPLN) stretches and amplifies the seed pulses to pulse energies of 2.5 µJ. A second OPA (MgO:PPSLT) 1120, pumped by about 1.4 mJ of energy from a Nd:YLF CPA 1140, amplifies the pulses to 25 µJ. A third OPA (barium borate; BBO) 1130 stretches the pulses to about 14 ps (full-width half-maximum (FWHM)). A cryogenically cooled Yb:YAG CPA 1150 pumps the third OPA 1130 at an intensity of about 40 GW/cm$^2$ and about 13 mJ of energy to yield a maximum pulse energy of about 0.85 mJ. (The conversion efficiency of 7.5% includes the reflection loss of the pump beam.)

Pieces of Brewster-angle Suprasil 300 glass compress the pulse from a FWHM amplified bandwidth of 474 nm to a compressed pulse duration of about 31.7 fs (4.5 cycles). (At this bandwidth, the transform-limited pulse duration is about 24.5 fs (about 3.5 optical cycles).) The compressed beam has a near-Gaussian spatial profile, a root-mean-square (rms) shot-to-shot energy stability of about 4%, an rms CEP stability of <200 mrad over about 30 seconds, and rms superfluorescence noise of about 9%.

The output of the OPCPA system 1100 is focused onto a Xe, Kr, or Ar gas jet 1172 in the high-harmonic generator 1170 using an f=200 mm or f=250 mm CaF$_2$ lens 1176. A nonlinear interaction between amplified pulse train and the gas jet 1172 yields high-harmonic pulses 1171, which are filtered with an X-ray filter 1174 and detected by extreme ultraviolet (XUV) spectrometer 1180. An Al-coated XUV photodiode (not shown) and a low-noise electronic amplifier (not shown) in XUV spectrometer 1180 detect and amplify, respectively, the filtered harmonics 1171. In certain embodiments, the XUV and soft X-ray pulses may be produced with a significant cut-off extension up to 160 eV (or even >300 eV) and a flux of 0.8×108 photons per second over 1% bandwidth. In other embodiments, the cut-off may be even higher, e.g., high enough to produce high-flux coherent soft X-ray pulses in the water-window (280-540 eV) range.

Figure 12A:
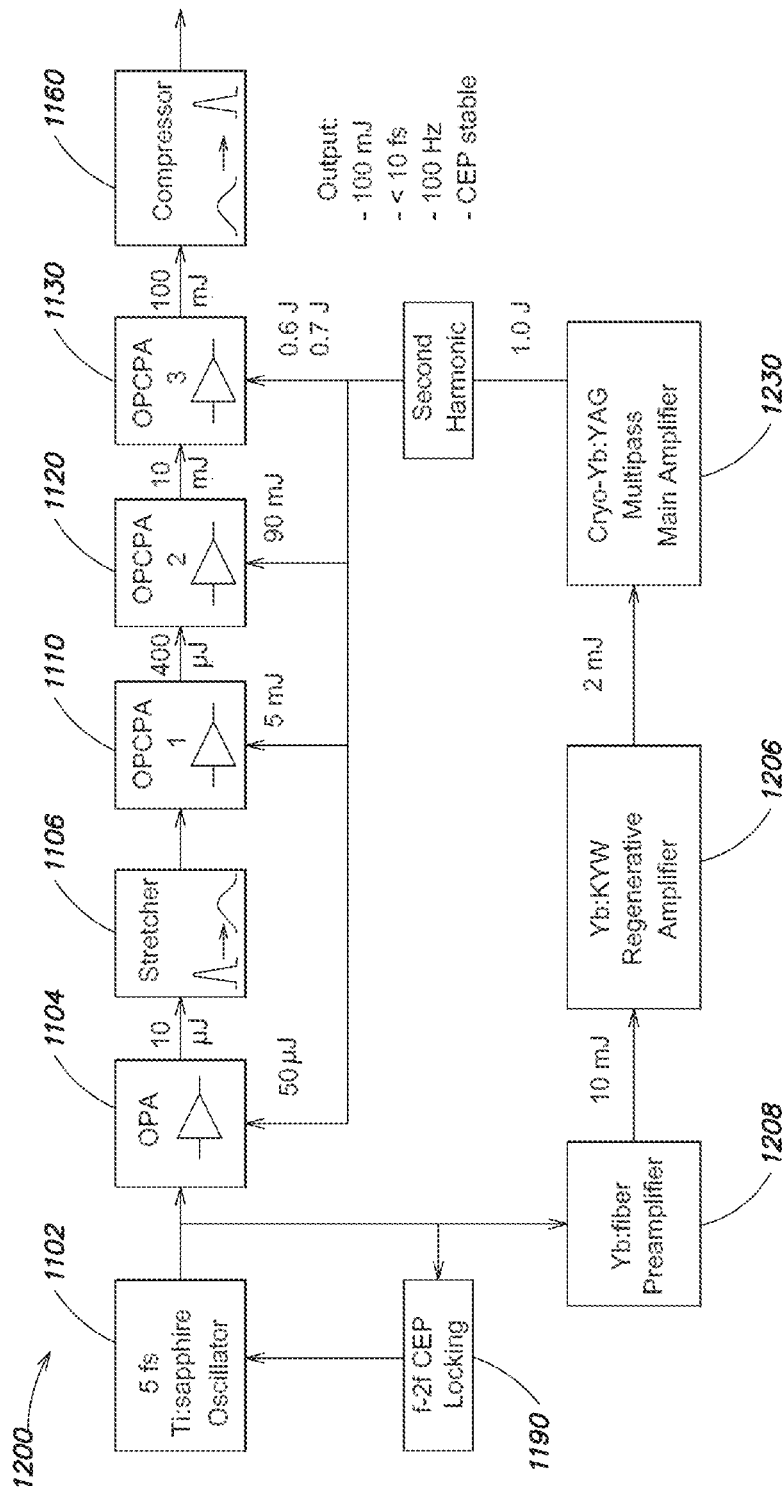
FIGS. 12A and 12B illustrate the CEP-stable OPCPA system shown in FIG. 11 with a cryogenically cooled, multi-pass power amplifier and a multi-pass preamplifier scaled for use in a 1-Joule laser driver according to embodiments of the present invention.
Figure 12B:
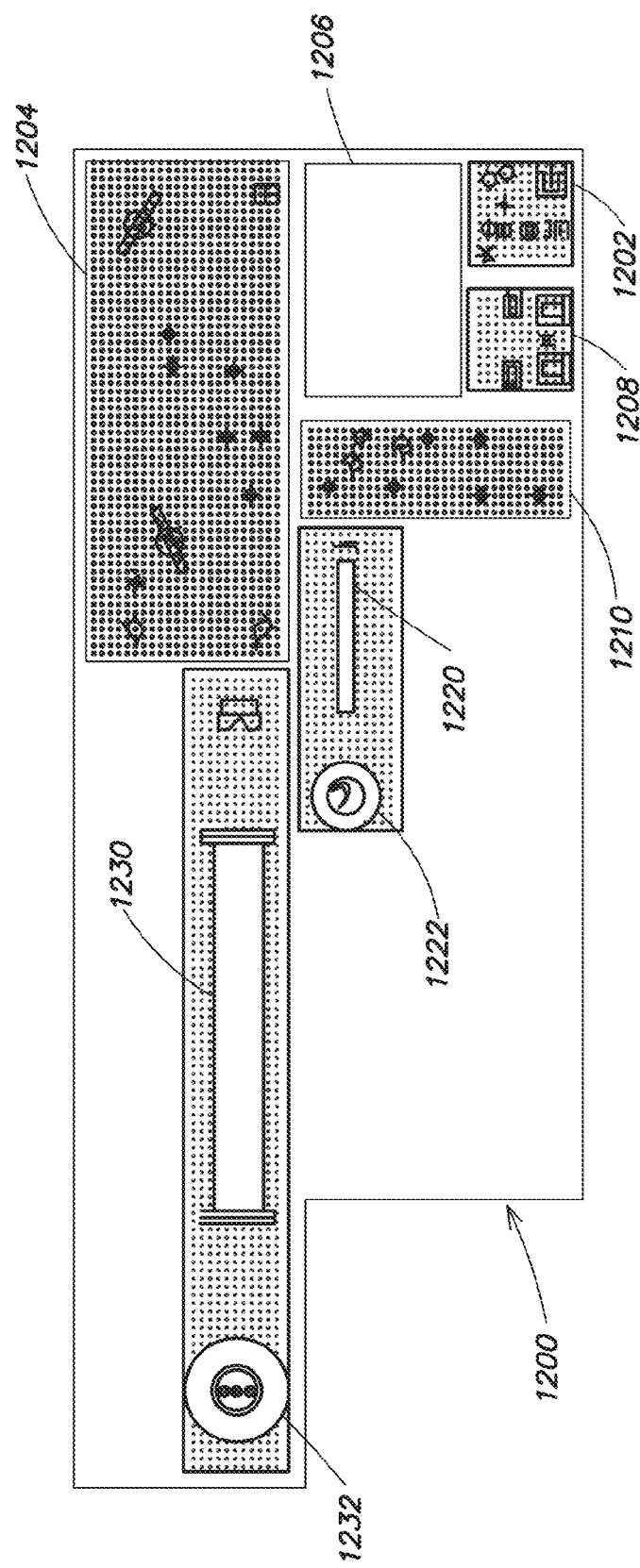

FIGS. 12A and 12B shows a cryogenic, ultrafast laser driver 1200 suitable for use as the Yb:YAG CPA 1150 shown in FIG. 11. The laser driver 1200 includes gain modules 1222 and 1232 with inventive composite optical gain media in a preamplifier 1220 and an amplifier 1230, respectively, that employ an inventive multi-pass architecture (described in greater detail below). This laser driver 1200 may operate at energies of 1 J or more.

The cryogenic Yb:YAG CPA 1200 includes a Yb:Fiber master oscillator 1202, a cascaded Martinez stretcher 1204, a Yb:KYW regenerative amplifier 1206, a Ytterbium-doped fiber amplifier (YDFA) 1208, and relay optics 1210. The master oscillator 1202 generates pulses, e.g., with a pulse energy of 0.25 nJ, a duration of 150 fs, and a pulse repetition frequency (PRF) of 80 MHz, that are routed through the laser driver 1200 with the relay optics 1210. (The CPA 1200 can also be seeded by a Ti:sapphire laser, e.g., as shown in FIG. 11.) These pulses may be stretched to bandwidths of 5 nm and pulse energies of 100 pJ with the cascaded Martinez stretcher 1204, then amplified and decimated using the YDFA 1208 and the regenerative amplifier 1206, e.g., to a 2 mJ pulse energy, a 3 nm pulse bandwidth, a 2 ns pulse duration, and a 100 Hz PRF. The pulses are amplified to 100 mJ and filtered to 1 nm with the preamplifier 1220 and gain module 1222 before being amplified to 1.2 J (bandwidth of 0.7 ns, pulse duration 0.8 ns) with the amplifier 1230 and gain module 1322. The fully amplified pulses are then compressed to a duration of 10 ps (1 J pulse energy, 100 Hz PRF). As understood by those of skill in the art, the pulse energies, durations, bandwidths, and repetition rates may be adjusted as desired, e.g., to 5-50 J pulse energies, 10-100 ps pulse durations, and 1-1000 Hz PRFs.

As noted above, cooling the gain media in the gain modules 1222 and 1232 reduces their gain bandwidths. To ameliorate this gain-narrowing, the pre-amplifier 1230 operates at 130 K, which allows amplification with the thermo-optic advantages of low-temperature operation without excessive gain narrowing. The power amplifier 1230 operates a liquid nitrogen temperature (77 K), which brings the energy up to 1 J with sufficient bandwidth for 5-10 ps pulses (suitable for OPCPA pumping).

TABLE 2 lists various parameters for examples of the preamplifier 1220 and amplifier 1230 shown in FIG. 12.

TABLE 2

Preamplifier and Amplifier Energetics

| Parameter | Preamplifier | | Amplifier | |
|---|---|---|---|---|
| Input Pulse Energy (mJ) | 2 | | 100 | |
| Input Pulse Duration (ns) | 1.5 | | 0.7 | |
| Output Pulse Energy (mJ) | 103 | 98 | 1.1 | 1.0 |
| Round-Trip Passes | 12 | 12 | 12 | 8 |
| Transmission (%) | 95% | 85% | 95% | 85% |
| Beam Diameter (mm) | 4.4 | 4.4 | 17 | 17 |
| Pump Power (W) | 270 | 350 | 2000 | 3000 |
| Duty Cycle | 20% | 20% | 20% | 20% |
| Fluence (J/cm$^2$) | 0.7 | 0.6 | 0.5 | 0.4 |
| Extraction Efficiency | 43% | 32% | 60% | 34% |
| Heat Flux (W/cm$^2$) | 70 | 90 | 60 | 90 |

Multi-Pass Architectures for Optical Amplification

Apertures in a composite optical gain medium defined by thermal foot-prints from pumping or cooling non-uniformities or discontinuities can lead to distortions in the beam emitted by the laser driver 1200 (FIG. 12). If left unchecked, these distortions can grow to undesirable levels. For example, consider a composite optical gain medium illuminated by a uniform pump beam but cooled over an area larger than the area illuminated by the pump beam. This mismatch between the cooled and pumped areas may cause heat to flow transversely with respect to the pump beam, breaking the one-dimensional symmetry provided by the composite optical gain medium's thin-disk geometry as described above with respect to FIGS. 9A-9D.

Propagation through a relatively long free-space path length may exacerbate the distortion caused by thermally induced apertures in the composite optical gain medium. Multiple passes through free space may cause further distortion, with additional Fresnel diffraction occurring every pass. Undesired spatial modulations (distortions) may also be amplified by nonlinear index ($n_2$) effects (e.g., self-focusing) in the composite optical gain medium. Fortunately, these distortions can be mitigated by relaying the beam with a pair of lenses.

Figures 13A, 13B:
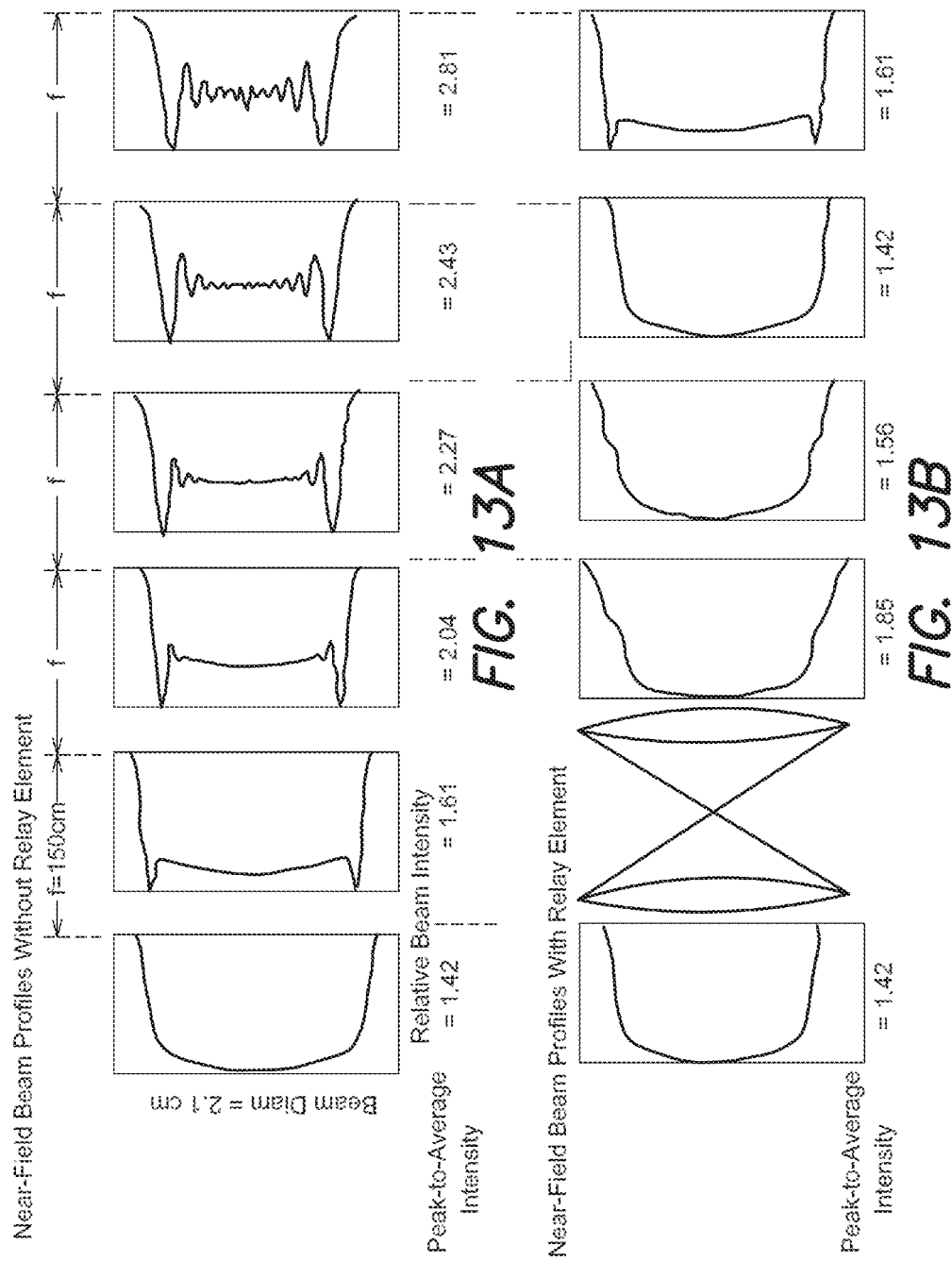
FIGS. 13A and 13B show plots of near-field beam profiles obtained without and with, respectively, relay elements.

FIGS. 13A and 13B illustrate the effects of diffraction on a super-Gaussian beam profile for a free-space beam and a relayed beam, respectively. FIG. 13A shows that the Fresnel diffraction produces large high spatial frequency intensity gradients in the free-space beam. With further propagation in a nonlinear medium, self-focusing enhances these gradients, reducing the effective filling factor and, ultimately, focusable power. The use of a two-lens combination reduces diffraction effects as shown in FIG. 13B, thereby minimizing the growth of intensity gradients due to nonlinear phase distortions. The effective filling factor is maintained for component placement through a post-relay distance of 2f, where f is the focal length of the relay lenses.

Figure 14A:
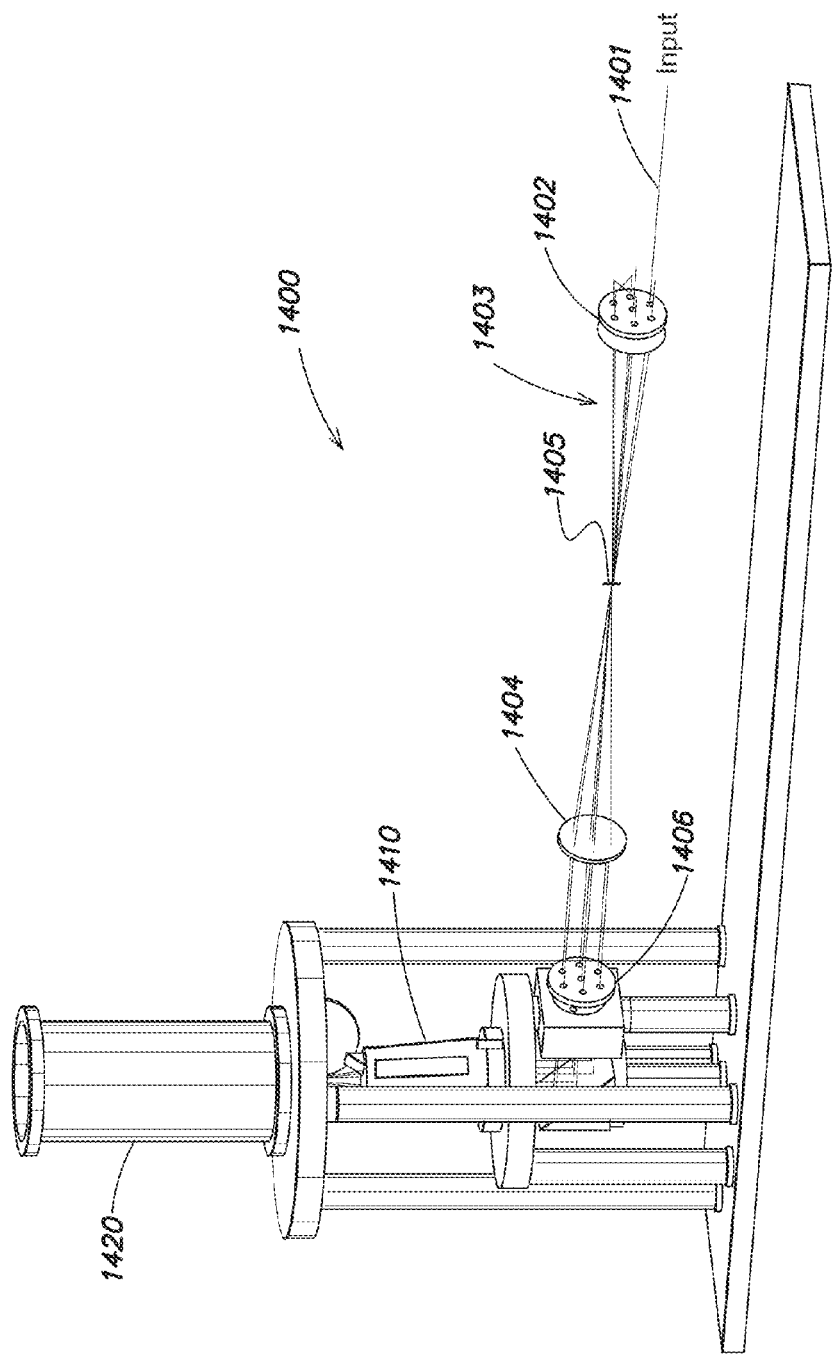
FIGS. 14A and 14B are perspective and cutaway views, respectively, of the multi-pass architecture used in the multi-pass amplifier and multi-pass preamplifier shown in FIG. 12.
Figure 14B:
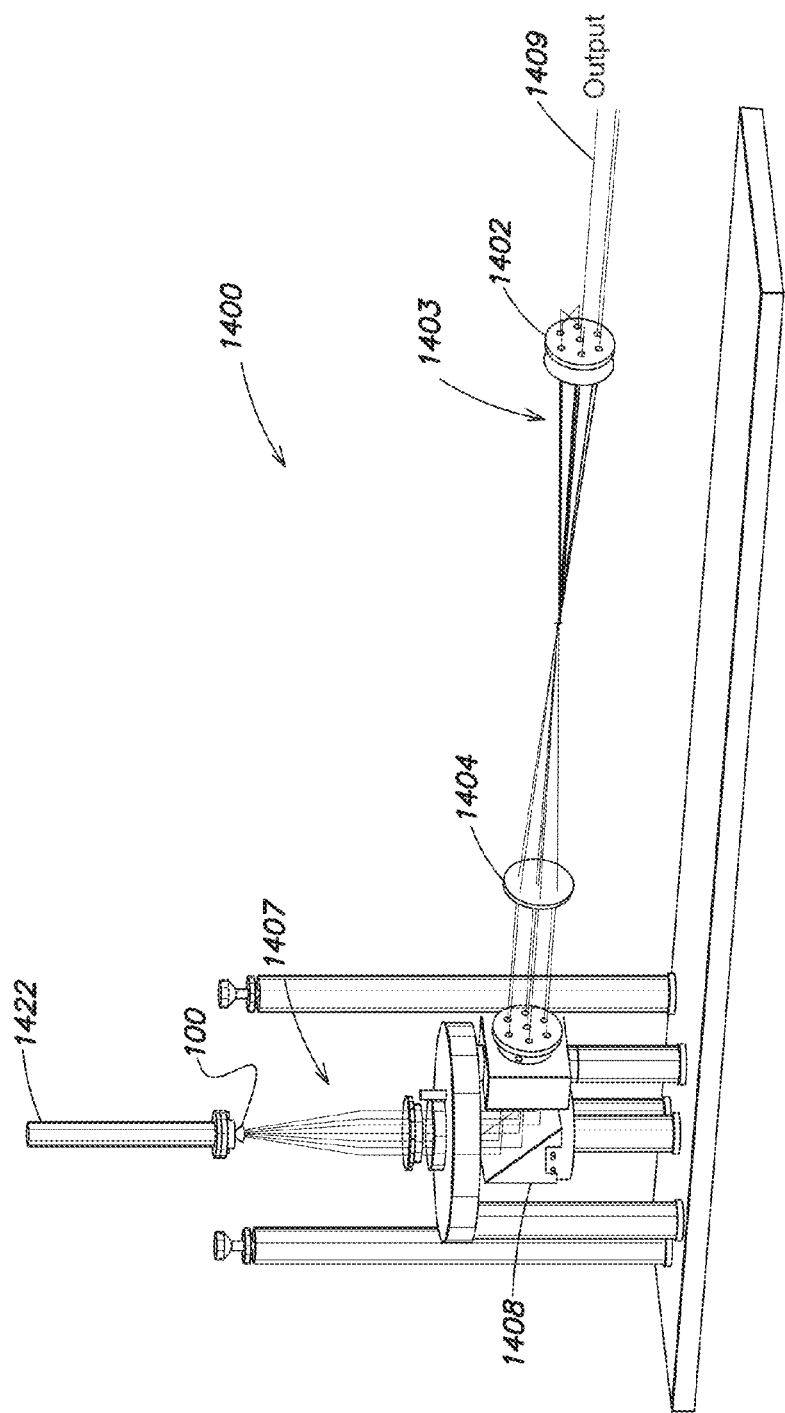

FIGS. 14A and 14B shows different views of a multi-pass beam-relay system 1400 suitable for use in the preamplifier 1220 and amplifier 1230 shown in FIG. 12. The beam relay system 1400 includes a first lens 1402 and a second lens 1404, each with a focal length f, that are separated by a distance 2f to form part of a 4f system. The composite optical gain medium 100 is located a distance f–$d_1$ from the second lens 1404, and the source or object is a diffraction-limited beam at the input/output polarizer (not shown) disposed a distance $d_1$ from the first lens 1402. An input beam 1401 from the source propagates parallel but offset relative to the 4f system's optical axis and illuminates the first lens 1402, which focuses the input beam 1401 to a spot at its back focal plane. This plane is a Fourier plane 1405 of the input beam's source (not shown). The second lens 1404 re-collimates the input beam 1401, which propagates through an alignment fiducial aperture 1406 kinematically machined to aid in the overall alignment of the system. The beam(s) propagate parallel to the optical axis to avoid optical aberrations.

An aperture 1906 (FIGS. 19A and 19B) in the Fourier plane 1405 filters (attenuates) high spatial frequency components in the relayed beams to reduce Fresnel diffraction effects, such as a high-spatial frequency ringing, which may occur after every pass. An apodizing aperture can be replace the Fourier-plane aperture 1906 if desired for subtler control in filtering spatial frequencies. The image relay provided by the lenses 1402, 1404 also reduces distortion. If desired, the beams can be aligned with a camera at a system image plane.

Figure 15A:
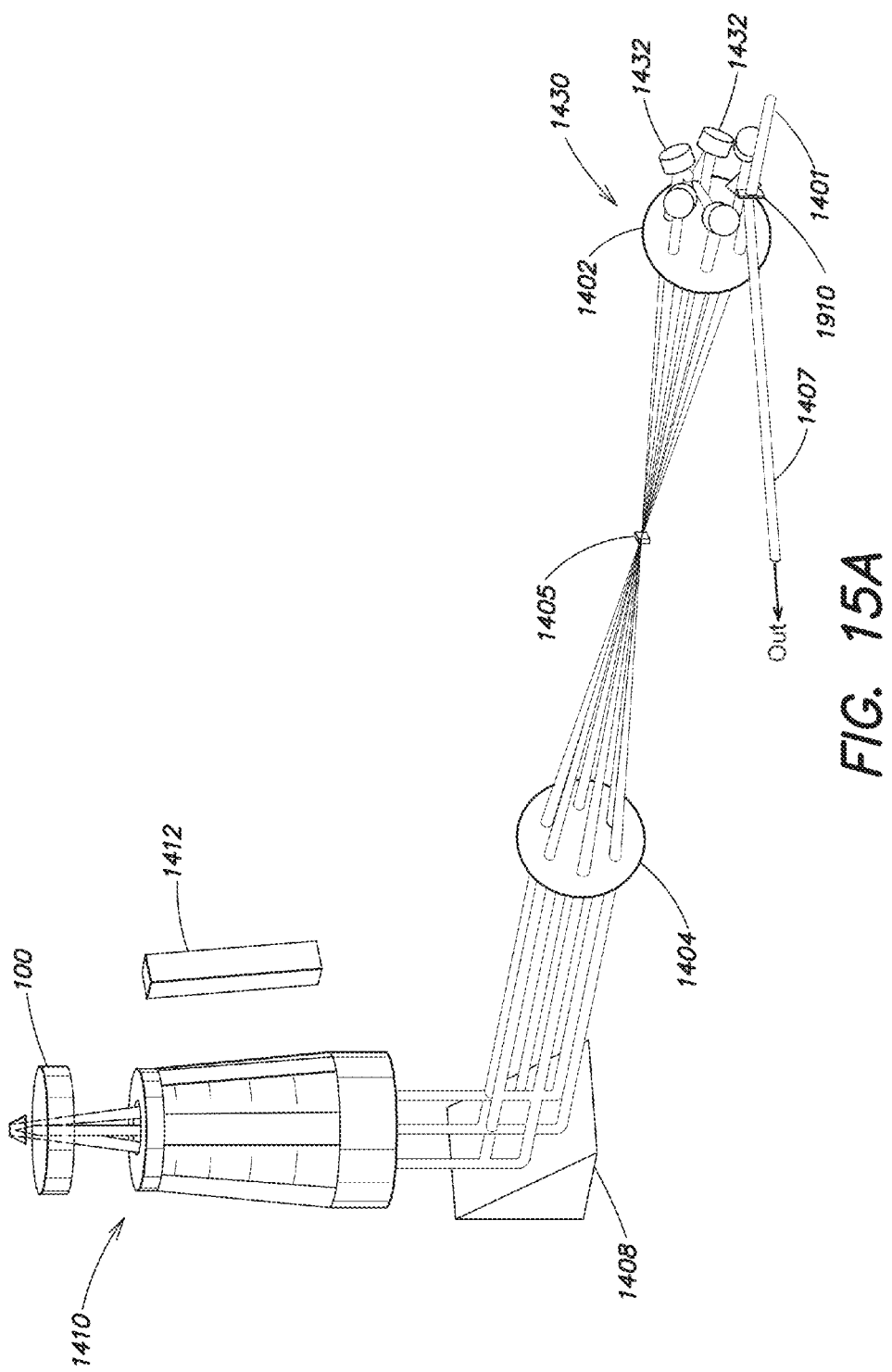

An angled mirror 1408 reflects the filtered input beam 1401 up through an angled kaleidoscopic mirror assembly (kaleidoscope) 1410, shown in greater detail in FIGS. 15A-15C. The kaleidoscope 1410 includes one or more mirrors 1412 fixed in a conical mount 1414. A first mirror 1412 reflects the input beam 1401 towards the composite optical gain medium 100. In some cases, the input beam 1401 has a beam diameter that is approximately equal to the diameter of the composite optical gain medium's gain layer 110 (FIGS. 1A-1C). For instance, the input beam 1401 may illuminate an area of about 0.75 mm$^2$ to about 2000 mm$^2$ on the composite optical gain medium's input/output surface 122. The input beam 1401 is amplified as it propagates through the composite optical gain medium's gain layer 110 and reflected off the reflective surface 112 back out of the composite optical gain medium 100.

Figure 18:
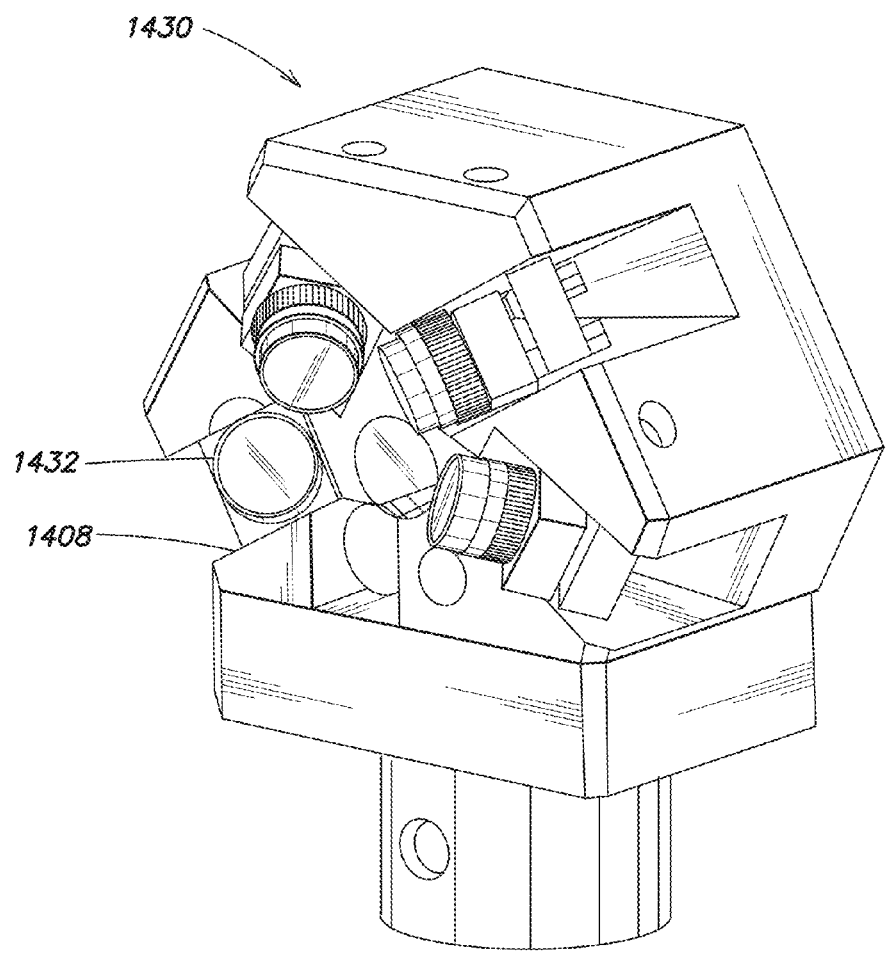
FIG. 18 is a perspective view of a mirror mount suitable for use in the multi-pass architecture of FIGS. 14A and 14B.

Because the input beam 1401 enters the composite optical gain medium 100 at a position offset from the optical axis, it exits offset as well to form a relay beam 1403 that propagates back through the 4f system to an optical switchyard 1430 (FIG. 18) at the input side of the first lens 1402. The optical switchyard 1430 includes four mirrors 1432 that connects the ringed transits by two 90° turns. (As shown in FIGS. 16A-16F, the relayed beam's polarization rotates with each turn.) The relay beam 1403 reflects off of one mirror 1432 for another pass through the multi-pass beam-relay system 1400 and the composite optical gain medium 100. In this example, the beam takes three double passes through the composite optical gain medium 100 before exiting as an output beam 1407.

The kaleidoscope 1410 is mounted vertically to provide cryogenic cooling for the composite optical gain medium 100. As shown in FIGS. 14B and 15B, the composite optical gain medium 100 is mounted in thermal communication with a commercial refrigerator 1422 (e.g., for cooling to 130 K, in which case the gain medium's temperature may be about 130 K). A cover 1420 insulates and protects the refrigerator 1422 and the composite optical gain medium 100. The composite optical gain medium 100 may also be thermally coupled to a liquid nitrogen dewar that cools the composite optical gain medium 100 to about 77 K via boiling heat transfer.

In operation, the composite optical gain medium 100 is pumped with a pump beam 1499 (FIG. 15C) from a laser diode or other suitable source. The pump beam 1499 propagates through an opening between the top of the kaleidoscope 1410 and the composite optical gain medium 1499. The pump beam 1499 illuminates a prism 1490 mounted on top of the angled kaleidoscope 1410 and is doubly passed through the gain element 100. At cryogenic temperature, this may yield 90% absorption of the pump beam 1499 by the composite optical gain medium 100. A second prism and a curved reflector (not shown) can be used to recirculate the pump beam 1499 for even greater absorption.

Figure 16A:
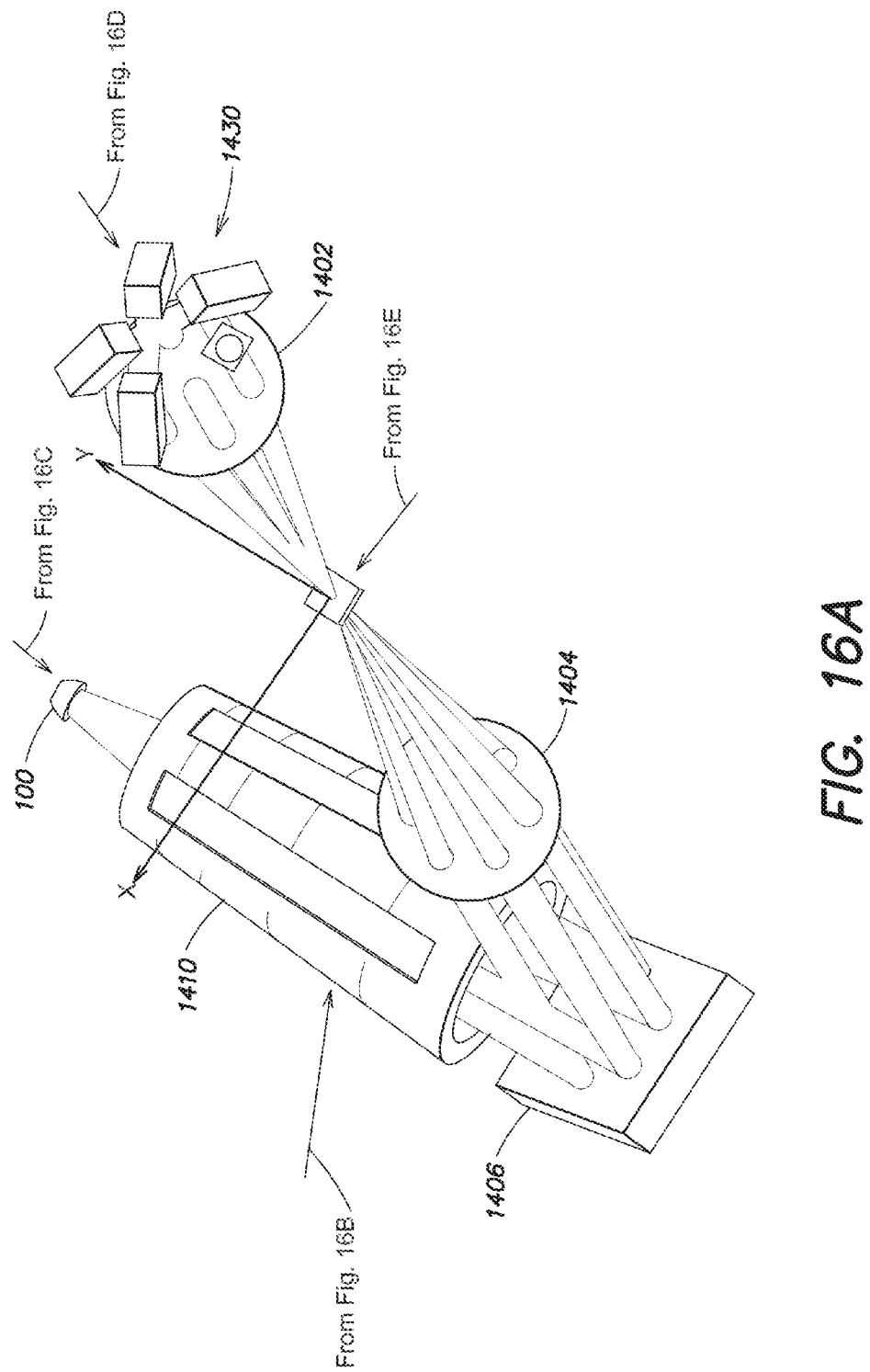
FIGS. 16A-16F illustrate beam profiles at various points in the beam path defined by the multi-pass architecture of FIGS. 14A and 14B.
Figure 16B:
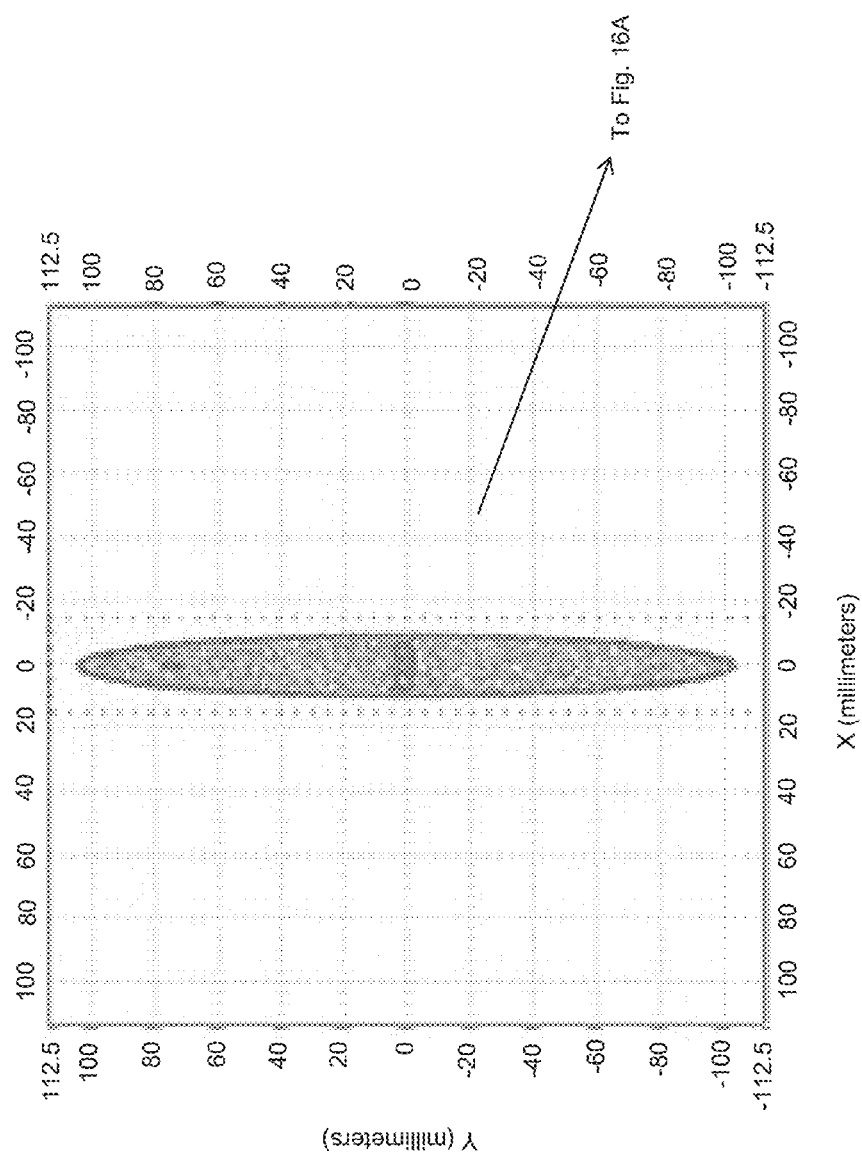
Figure 16C:
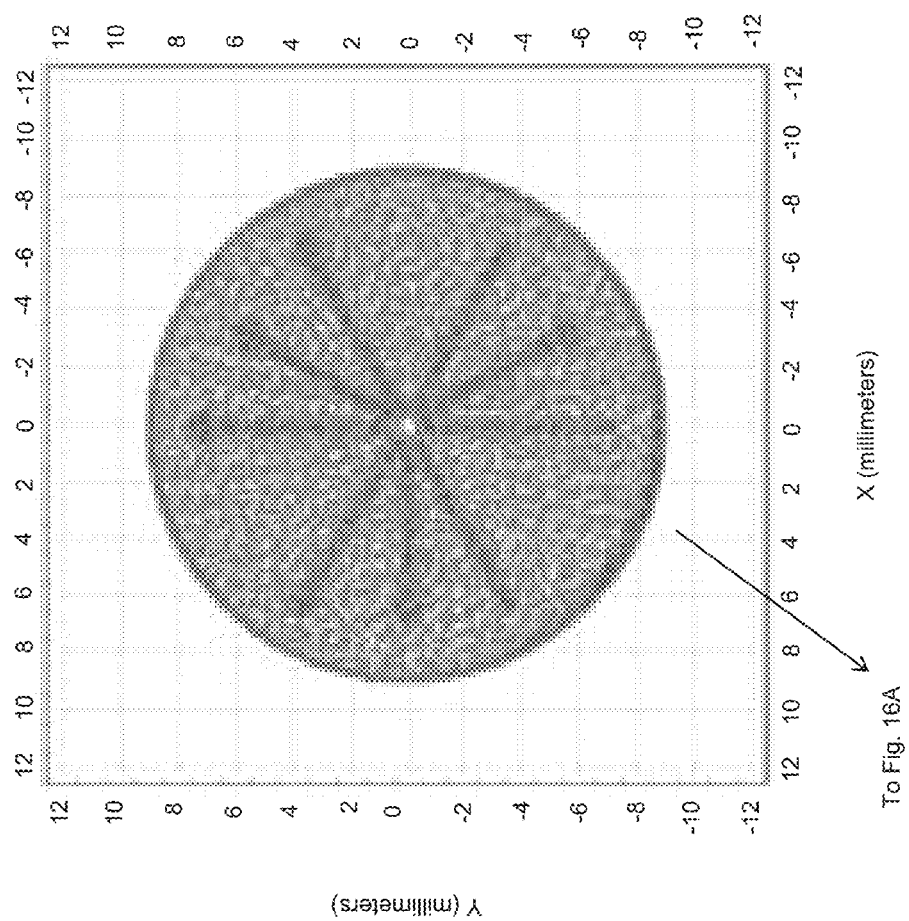
Figure 16D:
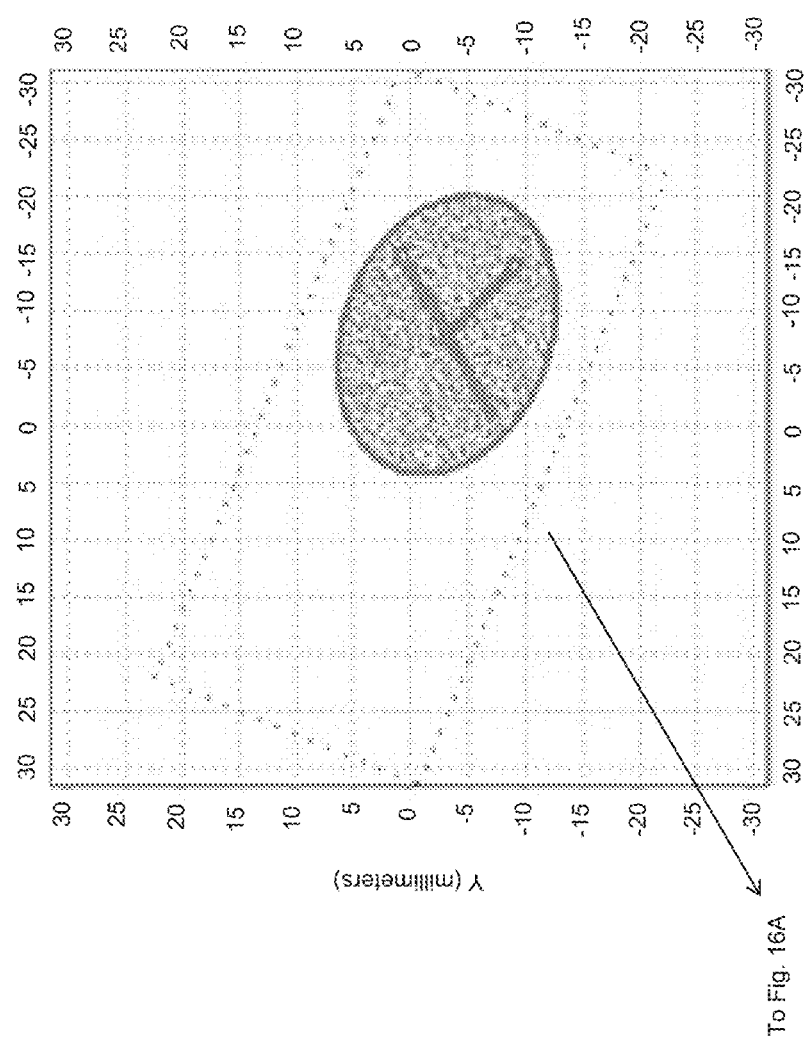
Figure 16E:
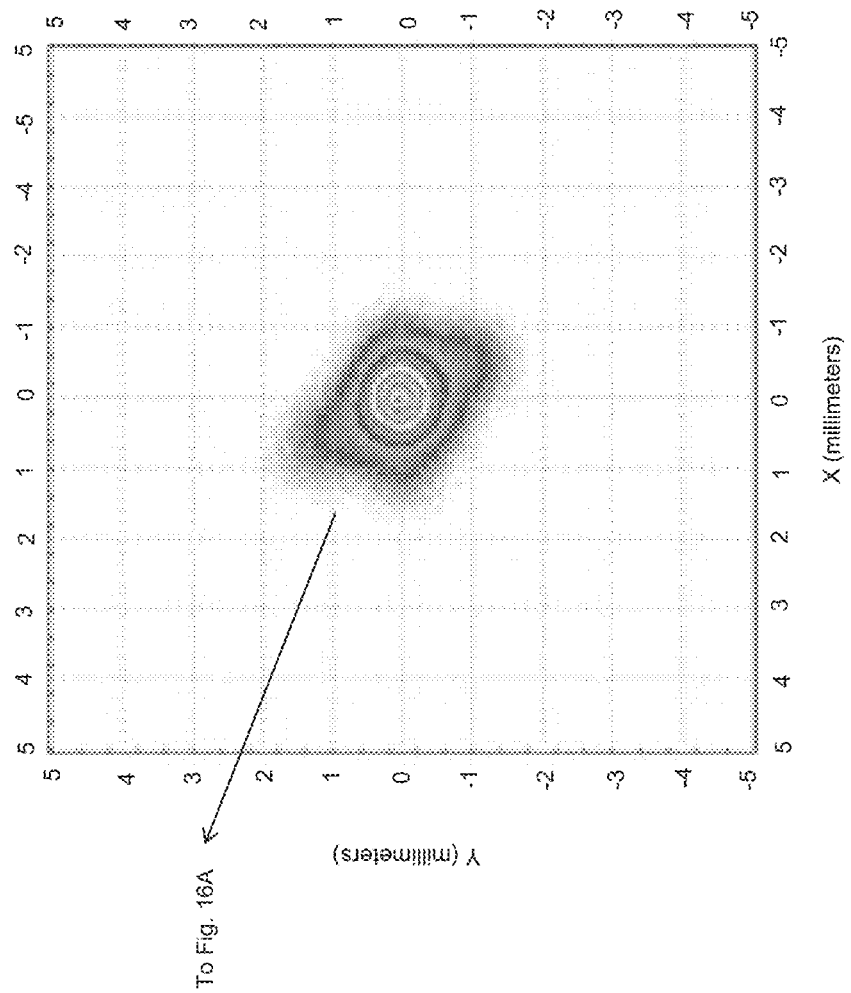
Figure 16F:
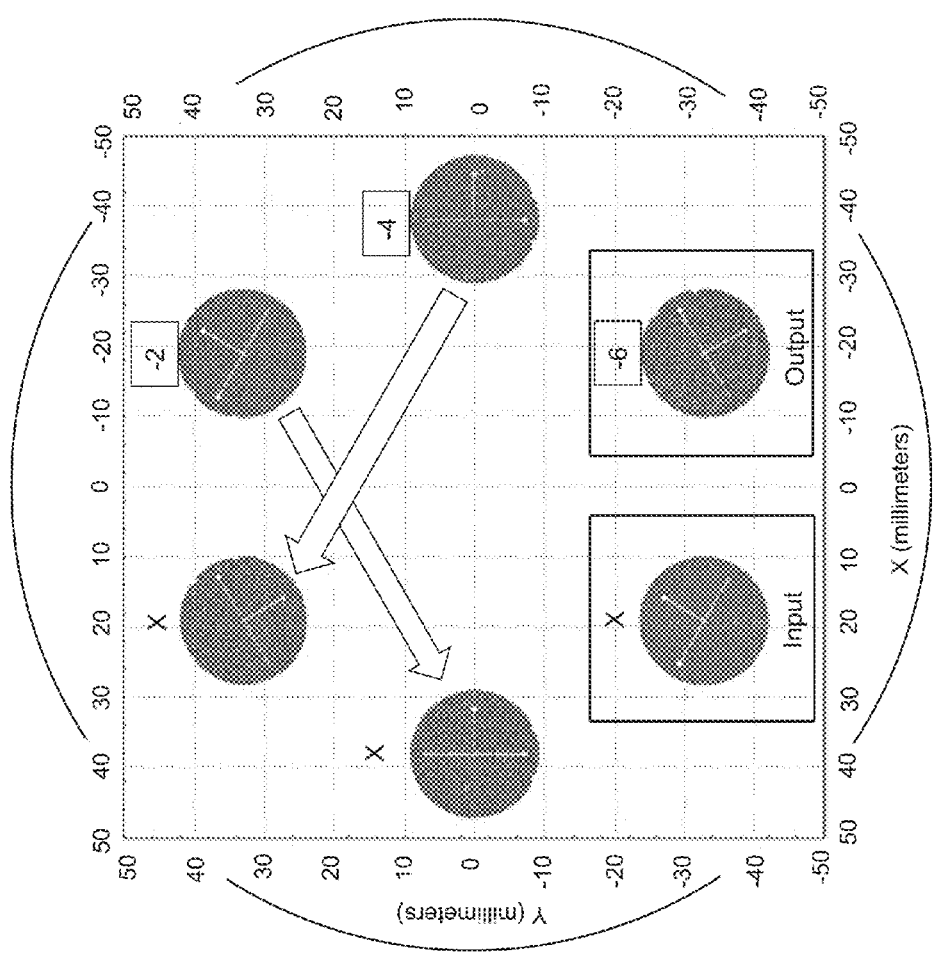

FIGS. 16A-16F illustrate the profiles and polarization states of the relayed beams at various points in the multi-pass architecture 1400. FIGS. 16D and 16F shows the profile and polarization states (lines) of the input and output beamlets on the mirror of the mirror-switchyard 1430 and the first lens 1402, respectively. (FIG. 16F also shows the positions.) The beams' polarization states are linear and rotate by 60° from position to position in the plane of the first lens. The beams are focused to respective points in the Fourier plane; in the absence of distortion or aberration, these points may be the size of a diffraction-limited spot as shown in FIG. 16E. The beam profile elongates due to reflection of the angled mirrors 1412 in the kaleidoscope 1410 as shown in FIG. 16B and is circular, with rotated polarization, at the reflective surface 112 (FIG. 1A) of the composite optical gain medium 100 as shown in FIG. 16C.

Figure 17A:
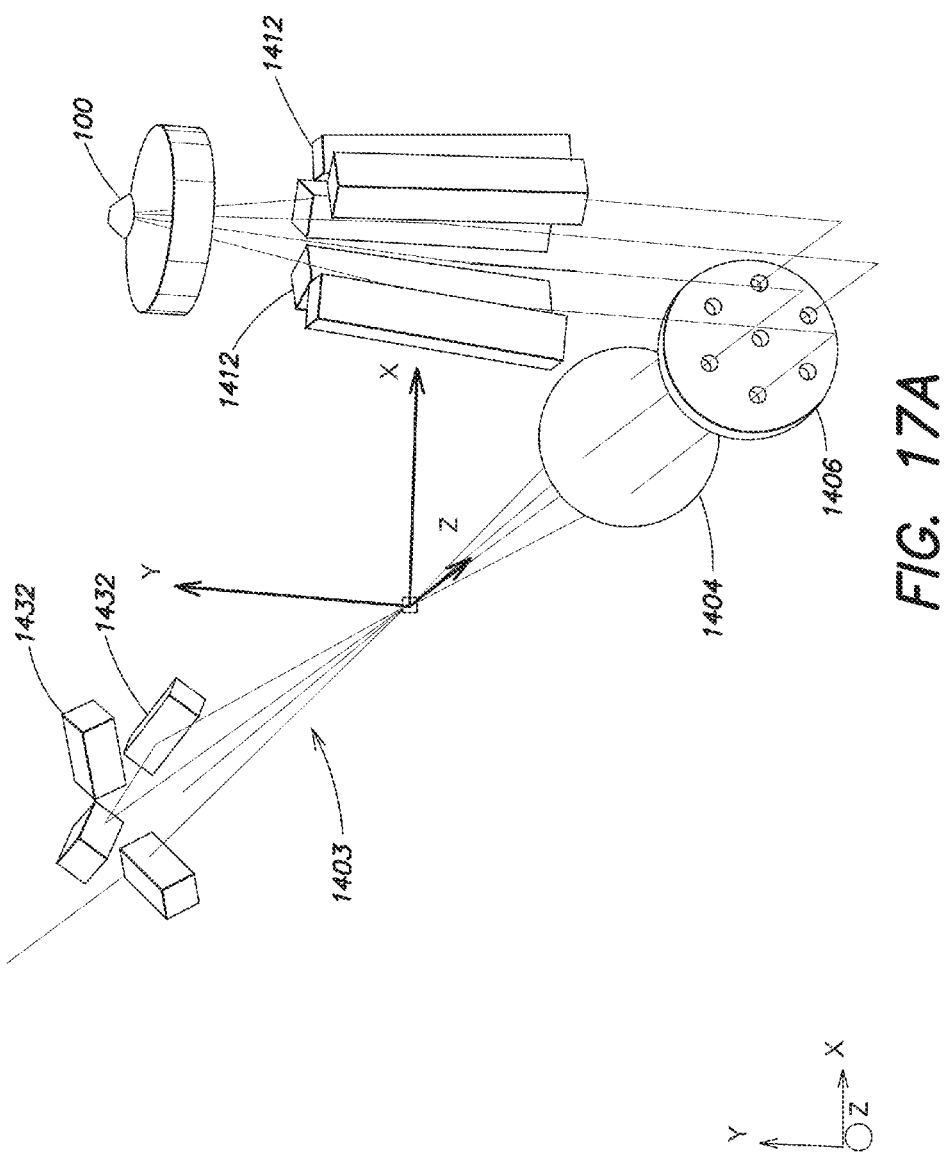
FIGS. 17A and 17B illustrate a fabrication tolerance test setup and fabrication tolerance test results, respectively, for one implementation of the multi-pass architecture of FIGS. 14A and 14B.
Figure 17B:
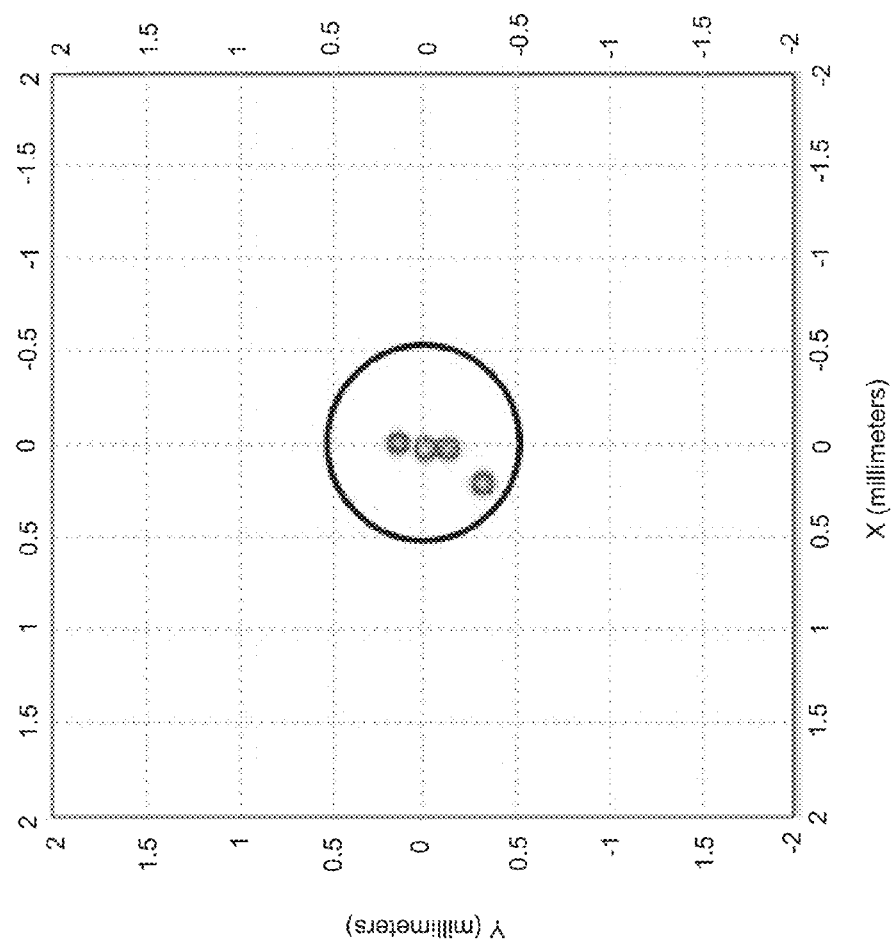

FIGS. 17A and 17B illustration the fabrication tolerance for the kaleidoscope 1410 and the alignment tolerance for the multi-pass architecture. FIG. 17B is a plot of the total irradiance versus transverse position at the Fourier plane 1405 (spatial aperture 1906 in FIGS. 19A and 19B) for a fabrication error of 0.1 degree for one of the angled kaleidoscope mirrors 1412. The resulting misalignment fits well, as the beams pass within an aperture (represented by the circle) that is ten times the diffraction limit for an ideal Gaussian beam. If desired, misalignment due to fabrication error can be corrected by vernier adjustment of the mirror mounts in the mirror switchyard 1430.

Figure 19A:
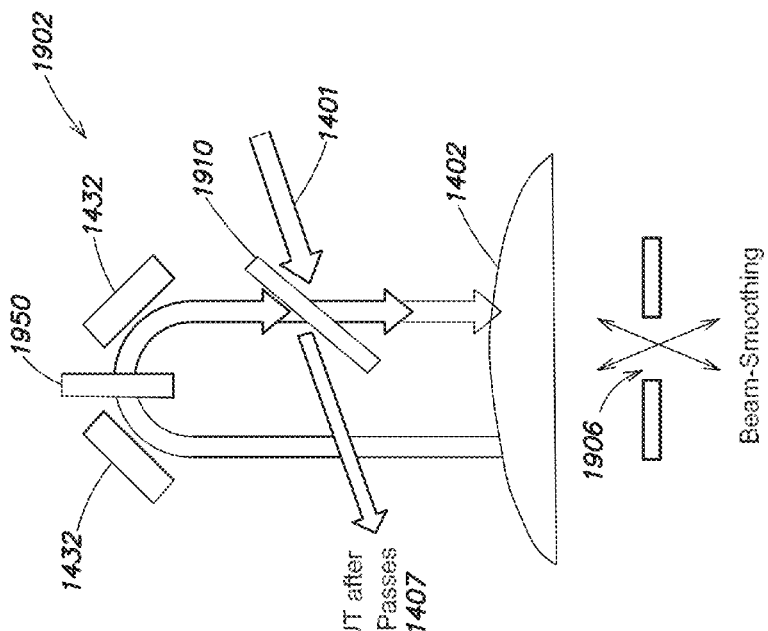
FIGS. 19A and 19B illustrate passive switching architectures suitable for coupling light into and out of the multi-pass architecture of FIGS. 14A and 14B.
Figure 19B:
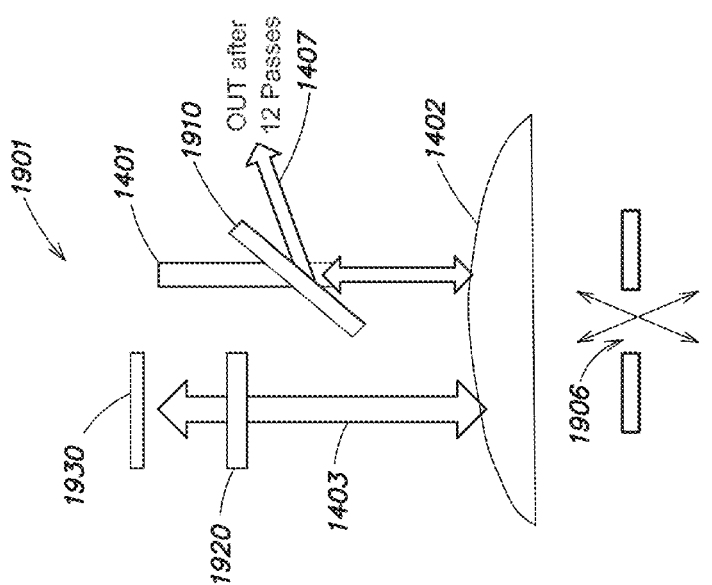

FIGS. 19A and 19B illustrate passive polarization-switching architectures 1901 and 1902, respectively, for coupling light into and out of the multi-pass architecture 1400 described above. Passive polarization switching is used to circulate the beam through multiple transits (e.g., six passes) through the composite optical gain medium 100. Passive switching (versus active switching) reduces the system's complexity and the number of optical components and dispenses with limits imposed by active optical switches.

In the architecture 1901 shown in FIG. 19A, the input beam 1401, which is linearly polarized, propagates through a thin-film linear polarizer 1910 towards the first lens 1404, which focuses the beam 1401 through an apodized aperture 1906 in the Fourier plane 1405. The relayed beam 1403 propagates back through the first lens 140 to a quarter-wave plate 1920, which transforms the beam's polarization state from a first linear state to an elliptical or circular state. The beam 1403 reflects of a mirror 1432, flipping the polarization state (e.g., from left-hand circular to right-hand circular), and back through the quarter-wave plate 1920, which transforms the beam's polarization state back to a second linear state rotated with respect to the first linear state. This incremental polarization state rotation continues until the relay beam 1403 reaches the output beam position 1407, at which point it propagates counter to the input beam 1401 with a polarization state that is orthogonal to the input beam's polarization state. Because its polarization state is orthogonal to the input beam's polarization state, the output beam 1407 reflects off the polarizer 1910 and out of the system.

In the architecture 1902 shown in FIG. 19B, the input beam 1401 reflects off the polarizer 1410 and into the multi-pass system. A relay beam 1403 propagates through the system via mirrors 1432 in the switchyard 1430 as described above, with a soft aperture 1906 in the Fourier plane 1405 smoothing the beam with every pass. In this case, a quartz rotator 1950 placed after the third transit rotates the beam's polarization by 90°, i.e., so it is rotated 90° with respect to the polarization of the input beam 1401. As a result, the relayed beam 1403 is re-injected into the system for six more passes through the composite optical gain medium 100 before reflecting off the polarizer 1910.

Both of these architectures allow for fixing deformation-induced distortions or stress-birefringence depolarization, which may occur at higher beam powers. For instance, one or more of the mirrors 1432 in the switchyard may include a deformable mirror 1930 at the gain medium's conjugate plane. These deformable mirrors may be adjusted using feedback to correct or composite for thermally-induced distortion.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An optical gain medium comprising:
   a gain layer having a first refractive index; and
   an index-matched layer, bonded to the gain layer, having a second refractive index substantially equal to the first refractive index,
   wherein the optical gain medium has an exterior surface that is at least partially defined by revolving a two-dimensional curve, disposed in a plane containing a longitudinal axis of the optical gain medium, about the longitudinal axis of the optical gain medium, and the two-dimensional curve comprises a curve of an order equal to or greater than two,
   wherein the gain layer has a thickness of about 0.01 mm to about 1.0 mm and a maximum outer diameter of about 1.0 mm to about 100 mm.

2. The optical gain medium of claim 1, wherein the gain layer comprises at least one of Yb:YAG, Yb:YLF, Nd:YAG, Yb:LuAG, Yb:SrF$_2$, Tm:YAG, Yb:GGG, Yb:KYW, Yb:KGW, Yb:KLuW, Yb:Lu$_2$O$_3$, Yb:Y$_2$O$_3$, Yb:S-FAP, and Yb:Calgo.

3. The optical gain medium of claim 1, wherein the index-matched layer comprises at least one of YAG, YLF, LuAG, SrF$_2$, GGG, KYW, KGW, KLuW, Lu$_2$O$_3$, Y$_2$O$_3$, S-FAP, and Calgo.

4. An optical gain medium comprising:
   a gain layer having a first refractive index; and
   an index-matched layer, bonded to the gain layer, having a second refractive index substantially equal to the first refractive index,
   wherein the optical gain medium has an exterior surface that is at least partially defined by revolving a two-dimensional curve, disposed in a plane containing a longitudinal axis of the optical gain medium, about the longitudinal axis of the optical gain medium, and the two-dimensional curve comprises a curve of an order equal to or greater than two,
   wherein the index-matched layer has a thickness of about 1.0 mm to about 30.0 mm and a maximum outer diameter of about 1.0 mm to 140.0 mm.

5. The optical gain medium of claim 1, wherein the gain layer generates at least one photon via fluorescence and the exterior surface is configured to reflect, refract, and/or scatter the at least one photon out of the optical gain medium.

6. The optical gain medium of claim 1, wherein the two-dimensional curve is at least one of a parabola or a hyperbola.

7. The optical gain medium of claim 1, wherein the index-matched layer defines an amplified spontaneous emission (ASE)-limited clear aperture having a diameter equal to about 50% to about 90% of the maximum diameter of the index-matched layer.

8. An optical gain medium comprising:
   a gain layer having a first refractive index; and
   an index-matched layer, bonded to the gain layer, having a second refractive index substantially equal to the first refractive index,
   wherein the optical gain medium has an exterior surface that is at least partially defined by revolving a two-dimensional curve, disposed in a plane containing a longitudinal axis of the optical gain medium, about the longitudinal axis of the optical gain medium, and the two-dimensional curve comprises a curve of an order equal to or greater than two,
   wherein the optical gain medium has a length of about 1 mm to about 30 mm along the longitudinal axis and a maximum diameter of about 1 mm to about 70 mm perpendicular to the longitudinal axis.

9. The optical gain medium of claim 1, further comprising:
   a reflective coating disposed on at least a portion of the gain layer to reflect incident radiation.

10. The optical gain medium of claim 1, further comprising:
    a cooling device, in thermal communication with the gain layer, to cool the gain layer.

11. A system for producing at least one amplified optical pulse, the system comprising:
    a source to produce at least one optical pulse; and
    a gain medium according to claim 1, in optical communication with the source, to amplify the at least one optical pulse so as to produce the at least one amplified optical pulse.

12. The system of claim 11, wherein the gain medium is a first gain medium, and further comprising:
    a second gain medium according to claim 1, in optical communication with the source and the first gain medium, to pre-amplify the at least one optical pulse prior to amplification by the first gain medium.

13. An optical gain medium comprising:
    a gain layer having a first refractive index;
    an index-matched layer, bonded to the gain layer, having a second refractive index substantially equal to the first refractive index; and
    at least one scattering center, disposed within the gain layer, to scatter at least one photon generated by fluorescence within the gain layer,
    wherein the at least one scattering center comprises an aperiodic array of scattering centers.

14. The optical gain medium of claim 13, wherein the at least one scattering center comprises a perturbation in the first refractive index of the gain layer.

15. The optical gain medium of claim 13, wherein the at least one scattering center comprises a defect in a crystalline structure of the gain layer.

16. The optical gain medium of claim 13, wherein the at least one scattering center is formed by illuminating a spot within the gain layer with an ultrafast laser.

17. The optical gain medium of claim 13, wherein the optical gain medium has a longitudinal axis and an exterior surface at least partially defined by revolving a two-dimensional curve about the longitudinal axis.

18. A system for producing at least one amplified optical pulse, the system comprising:
   an optical source to provide at least one optical pulse;
   a composite optical gain medium, in optical communication with the optical source, to amplify the at least one optical pulse so as to produce the at least one amplified optical pulse, the composite optical gain medium having a longitudinal axis and an exterior surface at least partially defined by revolving a two-dimensional curve, disposed in a plane containing the longitudinal axis of the composite optical gain medium, about the longitudinal axis; and
   a cooling device, in thermal communication with the composite gain medium, to cool the composite optical gain medium,
   wherein the two-dimensional curve comprises a curve of an order equal to or greater than two,
   wherein the at least one optical pulse has a beam diameter approximately equal to a diameter of the gain layer.

19. The system of claim 18, wherein the optical source comprises:
   a master oscillator, in optical communication with the composite optical gain medium, to emit the at least one optical pulse at a pulse energy of about 0.1 mJ to about 10 mJ, a pulse duration of about 0.1 ns to about 1 ms, and pulse repetition frequency of about 1 Hz to about 1 GHz.

20. The system of claim 18, wherein the at least one optical pulse illuminates an area of about 0.75 mm$^2$ to about 2000 mm$^2$ on a surface of the composite optical gain medium.

21. The system of claim 18, further comprising:
   a first optical element, in optical communication with the optical source and the composite optical gain medium, to project an image of the optical source to an image plane within the composite optical gain medium.

22. The system of claim 21, further comprising:
   a second optical element, in optical communication with the composite optical gain medium, to project a spatial Fourier transform of the image plane within the composite optical gain medium to a Fourier plane; and
   an aperture disposed in the Fourier plane, to attenuate at least a portion of the spatial Fourier transform so as to suppress undesired diffraction effects from appearing in the at least one amplified optical pulse.

23. The system of claim 18, wherein the composite optical gain medium defines:
   an input/output surface, adjacent to the exterior surface, to receive the at least one optical pulse; and
   a reflective surface, disposed opposite the input/output surface, to reflect at least a portion of the at least one optical pulse transmitted through the composite optical gain medium towards the input/output surface.

24. The system of claim 23, further comprising:
   at least one first optical element, in optical communication with the composite optical gain medium, to direct the at least one optical pulse toward the input/output surface of the composite optical gain medium at a first angle with respect to an optical axis of the system and a plane perpendicular to the optical axis of the system.

25. The system of claim 24, further comprising:
   at least one second optical element, in optical communication with the composite optical gain medium, to receive the at least one optical pulse from the reflective surface and to reflect the at least one optical pulse at a second angle with respect to the optical axis of the system and the plane perpendicular to the optical axis of the system.

26. The system of claim 25, wherein the reflective surface, the at least one first optical element, and the least one second optical element are configured to direct the at least one optical pulse along a plurality of passes through the composite optical gain medium.

27. The system of claim 18, wherein the composite optical gain medium comprises:
   a gain layer having a first refractive index; and
   an index-matched layer, bonded to the gain layer, having a second refractive index substantially equal to the first refractive index.

28. The system of claim 27, wherein the composite optical gain medium further comprises:
   at least one scattering center, disposed within the gain layer, to scatter photons generated by fluorescence within the gain layer.

29. The system of claim 27, wherein the composite optical gain medium is a first composite optical gain medium and the cooling device is a first cooling device, and further comprising:
   a second composite optical gain medium, in optical communication with the pump source and the first composite optical gain medium, to pre-amplify the at least one optical pulse; and
   a second cooling device, in thermal communication with the second composite optical gain medium, to cool the second composite optical gain medium.

30. The system of claim 29, wherein the second composite optical gain medium comprises:
   a gain layer having a first refractive index; and
   an index-matched layer, bonded to the gain layer, having a second refractive index substantially equal to the first refractive index,
   wherein the longitudinal axis is a first longitudinal axis, the exterior surface is a first exterior surface, the two-dimensional curve is a first two-dimensional curve, and the second composite optical gain medium comprises at least one of:
   a second longitudinal axis and a second exterior surface at least partially defined by revolving a second two-dimensional curve about the second longitudinal axis; and
   at least one scattering center, disposed within the gain layer, to scatter photons generated by fluorescence within the gain layer.

31. The system of claim 18, wherein the cooling device is configured to cool the composite optical gain medium to a temperature of about 60 K to about 120 K.

32. A method of amplifying an optical pulse, the method comprising:
   transmitting the optical pulse through a composite optical gain medium comprising:
   a gain layer having a first refractive index;
   an index-matched layer, bonded to the gain layer, having a second refractive index substantially equal to the first refractive index; and an exterior surface that is at least partially defined by revolving a two-dimensional curve, disposed in a plane containing a longitudinal axis of the composite optical gain medium, about the longitudinal axis of the optical gain medium, wherein the two-dimensional curve comprises a curve of an order equal to or greater than two, and wherein transmitting the optical pulse through the composite optical gain medium comprises:

illuminating an area of about 1 mm$^2$ to about 2000 mm$^2$ on the index-matched layer.

33. The method of claim 32, wherein transmitting the optical pulse through the composite optical gain medium comprises:

generating at least one photon via fluorescence in the gain layer; and ejecting the at least one photon from the composite optical gain medium via the exterior surface.

34. The method of claim 32, wherein transmitting the optical pulse through the composite optical gain medium comprises:

generating at least one photon via fluorescence in the gain layer; and scattering the at least one photon from at least one scattering center disposed within the gain layer.

35. The method of claim 32, wherein transmitting the optical pulse through the composite optical gain medium comprises:

imaging a source of the optical pulse to an image plane within the composite optical gain medium.

36. The method of claim 35, further comprising:

projecting a spatial Fourier transform of the image plane within the composite optical gain medium to a Fourier plane; and attenuating at least a portion of the spatial Fourier transform so as to suppress undesired diffraction effects from appearing in the at least one amplified optical pulse.

37. The method of claim 32, wherein transmitting the optical pulse through the composite optical gain medium comprises:

directing the optical pulse toward a reflective surface of the composite optical gain medium at a first angle with respect to the longitudinal axis and a plane perpendicular to the longitudinal axis.

38. The method of claim 37, further comprising:

reflecting the optical pulse from the reflective surface at a second angle with respect to the longitudinal axis and the plane perpendicular to the longitudinal axis.

39. The method of claim 32, wherein transmitting the optical pulse through the composite optical gain medium comprises transmitting the optical pulse through a plurality of passes through the composite optical gain medium.

40. The method of claim 32, further comprising:

emitting an amplified optical pulse from an amplified spontaneous emission (ASE)-limited clear aperture having a diameter equal to about 80% to about 100% of the maximum diameter of the index-matched layer.

41. The method of claim 32, further comprising:

generating the at least one optical pulse at a pulse energy of about 0.1 mJ to about 10 mJ, a pulse duration of about 0.1 ns to about 1 ms, and pulse repetition frequency of about 1 Hz to about 1 GHz.

42. The method of claim 32, further comprising:

cooling at least a portion of the composite optical gain medium to a temperature of about 60 K to about 120 K.

43. The method of claim 32, wherein the composite optical gain medium is a first composite optical gain medium, and further comprising:

pre-amplifying the optical pulse with a second composite optical gain medium.

44. The method of claim 43, further comprising:

cooling at least a portion of the second composite optical gain medium to a temperature of about 50 K to about 200 K.

45. A method of amplifying an optical pulse, the method comprising:

transmitting the optical pulse through a composite optical gain medium comprising:

a gain layer having a first refractive index;

an index-matched layer, bonded to the gain layer and having a second refractive index substantially equal to the first refractive index; and at least one scattering center disposed within the gain layer;

generating at least one photon by fluorescence within the gain layer; and scattering the at least one photon from at least one scattering center disposed within the gain layer, wherein the at least one scattering center comprises an aperiodic array of scattering centers.

* * * * *